United States Patent
Paulin et al.

(10) Patent No.: US 9,389,149 B2
(45) Date of Patent: Jul. 12, 2016

(54) WHEEL LOSS DETECTION ASPECT AND THEFT DETECTION ASPECT SYSTEM AND DEVICE FOR VEHICLES

(71) Applicant: InnoTech Safety Solutions Inc., Kelowna (CA)

(72) Inventors: Barry Dale Paulin, Hillside (CA); Jack Pinder, Kelowna (CA); Wayne Biggar, Princeton (CA); Victor Dusik, Halfmoon Bay (CA)

(73) Assignee: INNOTECH SAFETY SOLUTIONS INC., Kelowna (CA)

(*) Notice: Subject to any disclaimer, the term of this patent is extended or adjusted under 35 U.S.C. 154(b) by 0 days.

(21) Appl. No.: 14/050,904

(22) Filed: Oct. 10, 2013

(65) Prior Publication Data
US 2014/0309860 A1    Oct. 16, 2014

Related U.S. Application Data

(60) Provisional application No. 61/711,925, filed on Oct. 10, 2012.

(51) Int. Cl.
| | |
|---|---|
| *B60B 7/06* | (2006.01) |
| *F16B 1/00* | (2006.01) |
| *F16B 37/14* | (2006.01) |
| *G01M 17/013* | (2006.01) |
| *B60R 25/102* | (2013.01) |
| *B60R 16/027* | (2006.01) |

(Continued)

(52) U.S. Cl.
CPC .............. *G01M 17/013* (2013.01); *B60B 3/165* (2013.01); *B60R 16/027* (2013.01); *B60R 25/102* (2013.01); *B60B 2320/52* (2013.01); *B60R 2325/10* (2013.01); *B60R 2325/20* (2013.01); *F05B 2260/301* (2013.01); *F16B 39/101* (2013.01); *F16B 41/00* (2013.01)

(58) Field of Classification Search
CPC .............. B60R 16/0232; B60C 23/002; B60T 2240/03; B29L 2030/00
See application file for complete search history.

(56) References Cited

U.S. PATENT DOCUMENTS

| | | | | |
|---|---|---|---|---|
| 5,988,761 | A | * | 11/1999 | Visser ....................... B60B 3/16 188/218 XL |
| 7,012,511 | B2 | * | 3/2006 | Hayes .......................... 340/438 |

(Continued)

*Primary Examiner* — James Trammell
*Assistant Examiner* — Demetra Smith-Stewart
(74) *Attorney, Agent, or Firm* — Gowling WLG (Canada) LLP

(57) ABSTRACT

There is provided a warning device for detecting attachment integrity issues of a wheel assembly of a vehicle while the vehicle is in motion, the system comprising: a rigid body having: a first side and a second side to define an axis there between; a plurality of circumferentially distributed apertures extending axially between the first side and the second side, such that a spatial distribution of the plurality of circumferentially distributed apertures corresponds to a spatial distribution of wheel hub studs configured to receive a rim of the wheel; a plurality of wheel nut mounting locations positioned about each of the plurality of circumferentially distributed apertures on the first side, each of the plurality of wheel nut mounting locations having a mating surface for mating with an underside of a respective wheel nut; one or more rim mounting surfaces on the second side for mating with an outwardly facing exterior surface of the rim; and a plurality of indicators positioned adjacent to each of the plurality of circumferentially distributed apertures, such that each indicator of the plurality of indicators is uniquely associated with a respective aperture of the plurality of circumferentially distributed apertures.

18 Claims, 16 Drawing Sheets

(51) Int. Cl.
   *B60B 3/16*   (2006.01)
   *F16B 41/00*  (2006.01)
   *F16B 39/10*  (2006.01)

(56) References Cited

U.S. PATENT DOCUMENTS

| | | | |
|---|---|---|---|
| 7,415,888 B2* | 8/2008 | Marczynski et al. | 73/761 |
| 7,994,901 B2* | 8/2011 | Malis et al. | 340/426.33 |
| 8,613,347 B2* | 12/2013 | Pahle | F16D 65/12 188/17 |
| 8,640,553 B2* | 2/2014 | Barnett et al. | 73/862.045 |
| 2009/0179748 A1* | 7/2009 | Stephen et al. | 340/447 |
| 2013/0049952 A1* | 2/2013 | Schnare | 340/539.1 |
| 2013/0088069 A1* | 4/2013 | Dooner | 301/35.623 |
| 2013/0207447 A1* | 8/2013 | De Lima | 301/9.1 |
| 2014/0216169 A1* | 8/2014 | Romo et al. | 73/862.01 |
| 2014/0219746 A1* | 8/2014 | Dooner | 411/429 |

\* cited by examiner

WHEEL LOSS DETECTION ASPECT AND THEFT DETECTION ASPECT SYSTEM AND DEVICE FOR VEHICLES

FIELD

The present invention relates to detection systems and apparatus for vehicles.

BACKGROUND

When wheel nuts come off a vehicle, or the integrity of wheel nut fastening is affected through wheel stud damage, the results can be catastrophic and can pose a significant threat to the driver, cargo, and other road users. Core issues affecting wheel assembly loss include premature loosening of wheel nuts to the point where they come off, damage to the wheel studs themselves due to shock load, and wheel bearing damage.

Truck wheels (tire and wheel assembly) are coming off vehicles while on the highways at various speeds and have struck oncoming vehicles, resulting in many recorded fatalities. This included both a single wheel assembly as well as the complete dual assemblies. In the US alone, there are 35 such incidents daily, not all of which result in a fatality but each such incident has that potential.

Published government studies in both the US and Canada, determined that approximately 91% of such wheel assemblies leaving the vehicle are the result of two primary reasons. As documented in these government reports, these specifically relate to: A) Wheel studs loosening off, which have various underlying causes and typically result in a single wheel assembly leaving the vehicle; and B) The axle bearings overheating resulting in the bearing braking up and thus allowing the entire dual assembly to come off the vehicle.

Each individual tire/wheel assembly (or dual assembly) measures a large mass and weighs approximately 250 lbs and 500 lbs respectively. They typically leave the vehicle at speeds of approximately 60 mph (100 km per hr) and actually gain speed when free of the vehicle. The resulting inertia has the potential of causing massive damage to other vehicles, property, equipment as well as deaths.

Current solutions to restraining wheel assemblies from separating from a vehicle include physical barriers such as wheel guards and safety of wheel bolts. Other solutions involve sensing of wheel nut tightness. However, these current solutions are deficient for a number of reasons, including cumbersomeness to implement as well as a requirement to modify OEM equipment which can affect the structural integrity of the OEM equipment.

Theft of cargo from trucks including transport trucks is a world-wide problem. In Canada alone, loss of food products due to cargo theft exceeds $3 billion annually. Other targeted commodities include but are not limited to: beer, wine, liquor, cigarettes, pharmaceutical products, valuable metals (e.g. copper), computers and computer-related accessories. In the vast majority of cases, thieves obtain the cargo by stealing a truck/trailer unit or a trailer unit alone, then remove the cargo and abandon the unit or trailer. A recent example occurred in Hamilton, Ontario, where in October 2012 a load of copper was stolen with an estimated value of $5 million.

Global Positioning System (GPS) data alone is insufficient to provide intelligent monitoring of the security of vehicles and cargo. GPS data can only inform a remote monitoring control center of the whereabouts of a vehicle and its cargo and whether or not the vehicle is in motion.

BRIEF DESCRIPTION OF THE DRAWINGS

Exemplary embodiments of the invention will now be described in conjunction with the following drawings, by way of example only, in which:

FIG. 3b is an alternative embodiment of the sensor arrangement of FIG. 3a;

FIG. 3c is an alternative embodiment of the sensor arrangement of FIG. 3a;

FIG. 3d is an alternative embodiment of the sensor arrangement of FIG. 3a;

FIG. 4b is a perspective view embodiment of the detection device of FIG. 4a;

SUMMARY

Figure 1:
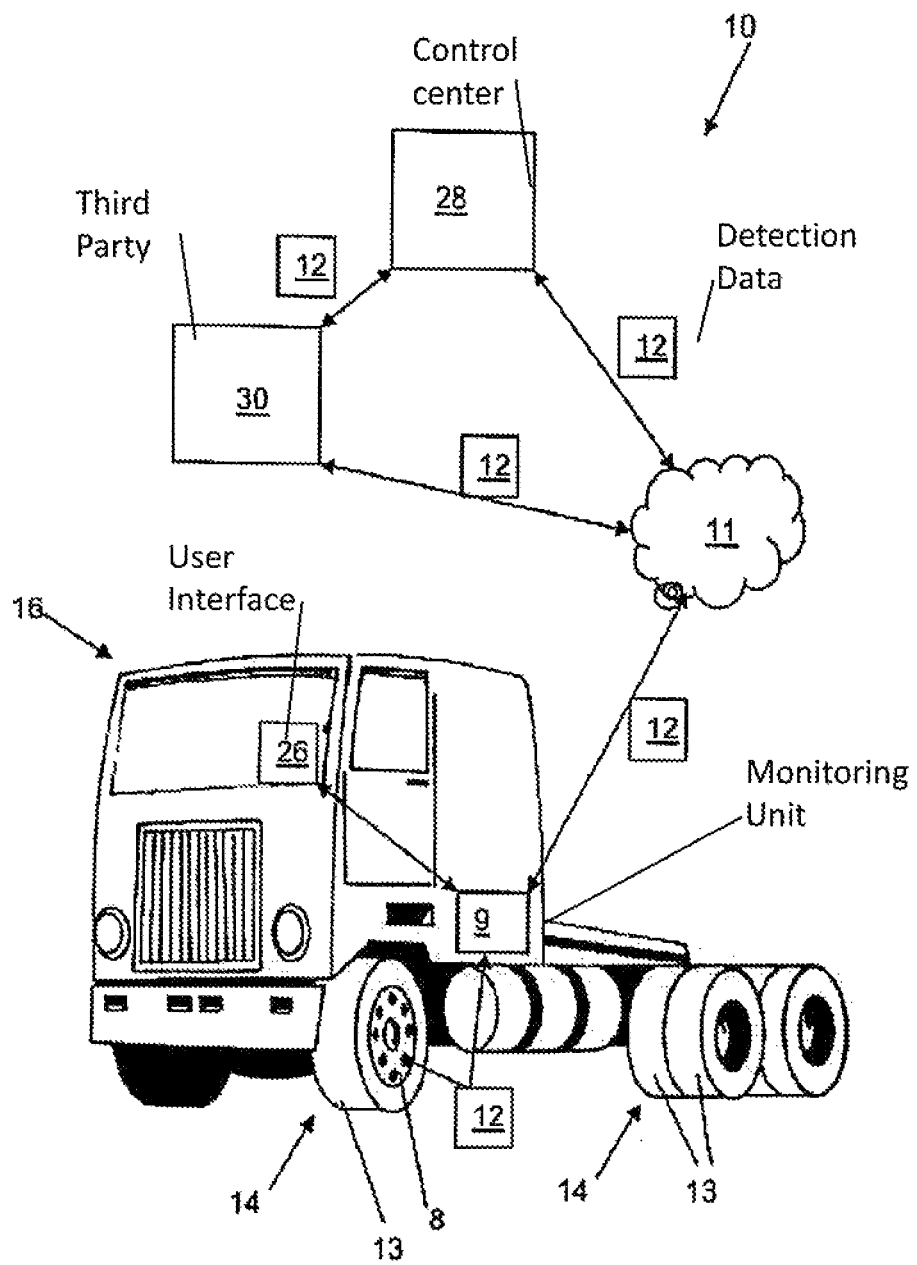
FIG. 1 is a system view of a wheel loss detection system.

It is an object of the present invention to provide detection apparatus and/or a detection system to obviate or mitigate at least one of the above-presented disadvantages.

When wheel nuts come off a vehicle, or the integrity of wheel nut fastening is affected through wheel stud damage, the results can be catastrophic and can pose a significant threat to the driver, cargo, and other road users. Core issues affecting wheel assembly loss include premature loosening of wheel nuts to the point where they come off, damage to the wheel studs themselves due to shock load, and wheel bearing damage. Contrary to current wheel detection system there is provided a warning device for detecting attachment integrity issues of a wheel assembly of a vehicle while the vehicle is in motion, the system comprising: a rigid body having: a first side and a second side to define an axis there between; a plurality of circumferentially distributed apertures extending axially between the first side and the second side, such that a spatial distribution of the plurality of circumferentially distributed apertures corresponds to a spatial distribution of wheel hub studs configured to receive a rim of the wheel; a plurality of wheel nut mounting locations positioned about each of the plurality of circumferentially distributed apertures on the first side, each of the plurality of wheel nut mounting locations having a mating surface for mating with an underside of a respective wheel nut; one or more rim mounting surfaces on the second side for mating with an outwardly facing exterior surface of the rim; and a plurality of indicators positioned adjacent to each of the plurality of circumferentially distributed apertures, such that each indicator of the plurality of indicators is uniquely associated with a respective aperture of the plurality of circumferentially distributed apertures.

Theft of cargo from trucks including transport trucks is a world-wide problem. In the vast majority of cases, thieves obtain the cargo by stealing a truck/trailer unit or a trailer unit alone, then remove the cargo and abandon the unit or trailer. Global Positioning System (GPS) data alone is insufficient to provide intelligent monitoring of the security of vehicles and cargo. Contrary to current theft detection systems there is provided a warning system for detecting the unauthorized use of a vehicle, the system comprising: one or more sensing devices mounted on the vehicle, the one or more sensing devices configured to generate a data signal for vehicle activity representative of vehicle operation by a vehicle operator; a processing system having: a first receiver unit for receiving the data signal; a second receiver unit for receiving an authorization code over a communications network and an operator code from the vehicle operator; a control module for: assigning, based on the authorization code, an authorization state to the vehicle as unauthorized to use; comparing the data signal to the authorization state; and generating an unauthorized use message if the data signal indicates vehicle operation while the authorization state remains unauthorized to use; and a transmission module for transmitting the unauthorized use message over the communications network for receipt by a monitoring service.

Global Positioning System (GPS) data alone is insufficient to provide intelligent monitoring of the security of vehicles and cargo. Although GPS data can inform a remote monitoring control center of the whereabouts of a vehicle and its cargo and whether or not the vehicle is in motion, such data cannot inform a remote observer of who is in control of the truck and whether that individual is an authorized operator.

A first aspect provided is a warning device for detecting attachment integrity issues of a wheel assembly of a vehicle while the vehicle is in motion, the system comprising: a rigid body having: a first side and a second side to define an axis there between; a plurality of circumferentially distributed apertures extending axially between the first side and the second side, such that a spatial distribution of the plurality of circumferentially distributed apertures corresponds to a spatial distribution of wheel hub studs configured to receive a rim of the wheel; a plurality of wheel nut mounting locations positioned about each of the plurality of circumferentially distributed apertures on the first side, each of the plurality of wheel nut mounting locations having a mating surface for mating with an underside of a respective wheel nut; one or more rim mounting surfaces on the second side for mating with an outwardly facing exterior surface of the rim; and a plurality of indicators positioned adjacent to each of the plurality of circumferentially distributed apertures, such that each indicator of the plurality of indicators is uniquely associated with a respective aperture of the plurality of circumferentially distributed apertures.

A second aspect provided is a warning system for detecting attachment integrity issues of a wheel assembly of a vehicle while the vehicle is in motion, the system comprising: a rigid body having: a first side and a second side to define an axis there between; a plurality of circumferentially distributed apertures extending axially between the first side and the second side, such that a spatial distribution of the plurality of circumferentially distributed apertures corresponds to a spatial distribution of wheel hub studs configured to receive a rim of the wheel; one or more sensors mounted adjacent to the rigid body, the one or more sensors including at least one pressure sensor and at least one temperature sensor, the pressure sensor configured to generate a pressure data signal associated with any of the plurality of circumferentially distributed apertures and the temperature sensor configured to generate a temperature data signal associated with a wheel bearing of the wheel assembly, such that the pressure data signal is indicative of local clamping pressure of any of the plurality of circumferentially distributed apertures as experienced by the rigid body and the temperature data signal is indicative of temperature of the wheel bearing; and a control system mounted on the vehicle and having a receiving unit comprising a receiver for receiving both the pressure data signal and the temperature data and providing indication of the data signals to a driver of the vehicle.

A third aspect provided is a warning device for detecting attachment integrity issues of a wheel assembly of a vehicle while the vehicle is in motion, the system comprising: a rigid body having: a first side and a second side to define an axis there between; a plurality of circumferentially distributed apertures extending axially between the first side and the second side, such that a spatial distribution of the plurality of circumferentially distributed apertures corresponds to a spatial distribution of wheel hub studs configured to receive a rim of the wheel; a plurality of first mounting surfaces positioned about each of the plurality of circumferentially distributed apertures on the first side, each of the plurality of mounting surfaces having a mating surface for mating with an adjacent mating surface of a first component of the wheel assembly; one or more second mounting surfaces on the second side for mating with an adjacent mating surface of a second component of the wheel assembly; and one or more sensors mounted on the rigid body, the one or more sensors configured to generate a data signal associated with any of the plurality of circumferentially distributed apertures, such that the data signal is indicative of local clamping pressure of any of the plurality of circumferentially distributed apertures as experienced by the rigid body positioned between the first component and the second component.

A fourth aspect provided is a warning system for detecting the unauthorized use of a vehicle, the system comprising: one or more sensing devices mounted on the vehicle, the one or more sensing devices configured to generate a data signal for vehicle activity representative of vehicle operation by a vehicle operator; a processing system having: a first receiver unit for receiving the data signal; a second receiver unit for receiving an authorization code over a communications network and an operator code from the vehicle operator; a control module for: assigning, based on the authorization code, an authorization state to the vehicle as unauthorized to use; comparing the data signal to the authorization state; and generating an unauthorized use message if the data signal indicates vehicle operation while the authorization state remains unauthorized to use; and a transmission module for transmitting the unauthorized use message over the communications network for receipt by a monitoring service.

A fifth aspect provided is a server for detecting the unauthorized use of a vehicle, the server comprising: a receiver unit for: receiving a data signal from a communications network, the data signal transmitted from one or more sensing devices mounted on the vehicle, the one or more sensing devices configured to generate and transmit a data signal for vehicle activity representative of vehicle operation by a vehicle operator; receiving an authorization code; and receiving an operator code wirelessly from the communications network; a control module for: assigning, based on the authorization code, an authorization state to the vehicle as unauthorized to use; comparing the data signal to the authorization state; and generating an unauthorized use message if the data signal indicates vehicle operation while the authorization state remains unauthorized to use; and a transmission module for transmitting the unauthorized use message over the communications network for receipt by a monitoring service.

One or more sensors is mounted adjacent to the rigid body, the one or more sensors configured to generate a data signal associated with any of the plurality of circumferentially distributed apertures, such that the data signal is indicative of local clamping pressure of the respective wheel nut mounted on the mating surface of said any of the plurality of circumferentially distributed apertures as uniquely identified by the respective indicator.

One or more sensors is selected from the group consisting of: a mechanical switch; a magnetic switch; a capacitive switch; a pressure sensitive switch; one or more strain gauges; a temperature sensor; and a resistive switch.

One or more sensors is configured to measure overall clamping pressure representative of an aggregate clamping pressure between the one or more rim mounting surfaces on the second side and the outwardly facing exterior surface of the rim.

One or more sensors is configured to measure clamping pressure applied to the respective wheel hub stud on which the respective wheel nut is mounted as uniquely identified by the respective indicator.

The data signal is indicative of tightening of respective wheel nut over or under a specified tightening threshold.

The specified tightening threshold is a clamp force threshold.

The specified tightening threshold is a clamp pressure threshold.

The data signal is a wireless signal.

The one or more sensors is battery powered or hard-wired.

One or more sensors comprises a plurality of standalone sensors such that each aperture of the plurality of circumferentially distributed apertures has a sensor of the plurality of standalone sensors mounted adjacent thereto.

A number of the plurality of circumferentially distributed apertures is equal to a number of the wheel hub studs of the wheel.

The rigid body is in the shape of an annulus or plate or disk.

The sides of the rigid body are planar.

Comprising a control unit for processing the detection data against a specified threshold indicative of an integrity issue to generate an alarm signal in the event that the detection data exceeds the specified threshold.

The specified threshold is selected from the group consisting of: local clamp force maximum; local clamp force minimum; overall clamp force maximum; overall clamp force minimum; temperature maximum; temperature minimum; and temperature rate.

Comprising temperature sensor for indicating a temperature.

The detection data is indicative of a loss of communication between a control unit remote from the detection device and at least one of the one or more sensors.

The detection data is indicative of a loss of communication between the control unit and all of the one or more sensors, thus indicating a wheel loss event.

The control unit is part of a monitoring unit attached to the vehicle remote from the wheel.

The control system is further configured to transmit indication of the data signals wirelessly to a monitoring service remote from the vehicle.

The rigid body is incorporated as integral to the rim of the wheel assembly.

The rigid body is configured for being received into a recess of the rim of the wheel assembly and releasably attached to the rim of the wheel assembly.

The rigid body is incorporated as integral to the wheel hub of the wheel assembly.

The rigid body is configured for being received into a recess of the wheel hub of the wheel assembly and releasably attached to the wheel hub of the wheel assembly.

The temperature is affixed to a wheel hub of the wheel assembly.

The control system processes the temperature data to generate an overheat alarm signal when a temperature sensed by the temperature sensor reaches or exceeds a specified temperature level and the control system is configured provide indication of the overheat alarm signal to the driver of the vehicle.

Comprising a temperature sensor.

The detection data is indicative of a loss of communication between the control system and all of the one or more sensors, thus indicating a wheel loss event.

The first component is a wheel hub and the second component is a wheel rim.

One or more sensors is selected from the group consisting of: a mechanical switch; a magnetic switch; a capacitive switch; a pressure sensitive switch; one or more strain gauges; a temperature sensor; and a resistive switch.

One or more sensors is configured to measure overall clamping pressure representative of an aggregate clamping pressure between the first component and the second component as experienced by the rigid body.

The control module is further configured to change the authorization state as authorized to use if the operator code matches the authorization code and the authorization state is currently designated as unauthorized to use.

The control module is further configured to change the authorization state as unauthorized to use if the operator code matches the authorization code and the authorization state is currently designated as authorized to use.

The transmission module is further configured to transmit the authorization state over a communications network for receipt by the monitoring service.

The transmission module is further configured to transmit the authorization state to a user interface mounted on the vehicle.

The vehicle is a cab and trailer.

The vehicle is a cab.

The vehicle is a trailer.

The operator code is entered into a user interface mounted on the vehicle.

The vehicle comprises a cab and trailer and the operator code is entered into a user interface located in the cab.

The processing system is mounted to the vehicle.

The vehicle comprises a cab and trailer and the processing system is mounted to the trailer.

The processing system is located on a remote server.

The first receiver unit is configured to receive the data signal wirelessly over the communications network.

The second receiver unit is configured to receive the operator code wirelessly over the communications network.

The processing system is mounted to the vehicle and the transmission module is configured to transmit the unauthorized use message wirelessly to the monitoring service remote from the vehicle.

The vehicle comprises a trailer and the transmission module is configured to transmit the unauthorized use message to a cab remote from the trailer.

The second receiver unit is further configured to receive geographical position information of the vehicle over a communications network from a geographical position system mounted on the vehicle.

The unauthorized use message comprises the geographical position information of the vehicle.

At least one of the authorization code and operator code are alphanumeric.

The one or more sensing devices is a geographical positioning device.

The one or more sensing devices is a motion detector.

The one or more sensing devices is a trailer tether sensor.

The one or more sensing devices is tested upon start-up of the system.

The processing system persistently stores copies of generated unauthorized use messages.

The monitoring service is administered by a remote server.

The control module is further configured to change the authorization state as authorized to use if the operator code matches the authorization code and the authorization state is currently designated as unauthorized to use.

The control module is further configured to change the authorization state as unauthorized to use if the operator code matches the authorization code and the authorization state is currently designated as authorized to use.

The transmission module is further configured to transmit the authorization state over a communications network for receipt by the monitoring service.

The transmission module is further configured to transmit the authorization state to a user interface mounted on the vehicle.

The vehicle is a cab and trailer.

The vehicle is a cab.

The vehicle is a trailer.

The operator code is entered into a user interface mounted on the vehicle.

The vehicle comprises a cab and trailer and the operator code is entered into a user interface located in the cab.

The transmission module is configured to transmit the unauthorized use message to the monitoring service wirelessly.

The monitoring service is administered by the remote server.

The vehicle comprises a trailer and the transmission module is configured to transmit the unauthorized use message to a cab remote from the trailer.

The receiver unit is further configured to receive geographical position information of the vehicle over a communications network from a geographical position system mounted on the vehicle.

The unauthorized use message comprises the geographical position information of the vehicle.

At least one of the authorization code and operator code are alphanumeric.

At least one or more sensing devices is a geographical positioning device.

The one or more sensing devices is a motion detector.

The one or more sensing device is a trailer tether sensor.

The control module persistently stores copies of generated unauthorized use messages.

DESCRIPTION

As further described below, a detection system is implemented to provide an automatic early warning of attachment integrity issues of vehicle wheel assemblies when they initially occur. The system includes a messaging system with alarms to show up in the cab of the truck for the driver, in the case of a transport truck. The messaging system can also (e.g. simultaneously) transmit a message to that company's corporate office and/or to a third party who will maintain computer records of all such electronic transmissions. The system can have a monitor and display within the driver area, and can function similar to a Black Box in an aircraft, where detection data representative of the attachment integrity can be persistently recorded in terms of date and/or time the message was sent and other pertinent data. The detection data can also represent adherence to a predefined wheel maintenance schedule, for example completion of a scheduled action to check and confirm settings of wheel nuts after a wheel repair/replacement.

Referring to FIG. 1, shown is a detection system 10 for detecting and reporting detection data 12 collected from a detection device 8 to a monitoring unit 9, the detection data 12 related to degradation level of attachment integrity of a wheel 13 and/or complete wheel assembly 14 of a vehicle 16 (e.g. automobile, truck, etc.). In one embodiment, the monitoring unit 9 can have a persistent memory (XX—see Figure X) configured as Black Box, such that access to the persistent memory can be protected using AES encryption (or other encryption) to inhibit tampering by taking apart the Black Box and attempts to reverse engineer the monitoring unit 9 or have unauthorized alteration or and/or access to the data 12 recorded and stored therein. The detection data 12 can be representative of an early warning of attachment integrity issues for the wheel 13 and/or wheel assembly 14, based on temperature issues related to wheel bearing temperature issues and/or pressure issues that can be related to wheel stud issues. It is recognized that the detection data 12 can be used by the system 10 to help predict a pre and/or post wheel 13 loss event. It is recognised that the loss event can be for one or more wheels 13 and in the extreme case for the entire wheel assembly 14 including the wheel hub 24. One example is where the detection data 12 is used by the system 10 in helping to predict a wheel 13 (and/or wheel assembly 14) separation event before it occurs due to identified attachment integrity issues, such as when one or more wheel studs are broken, and then reporting the detection data 12 indicative of attachment integrity issues to the monitoring unit 9 "pre" wheel 13 (and/or wheel assembly 14) separation event. It is also recognized that the detection data 12 could be used by the system 10 to indicate an actual wheel 13 loss event and/or wheel assembly 14 loss event in the case of sudden and catastrophic failure. For example, the system 10 could be operated as an alarm system to indicate that a wheel 13 (and/or wheel assembly 14) has actually physically separated from the vehicle 16, i.e. post separation event, which would be broadcast to the driver (e.g. via the monitoring unit 9), truck dispatch, insurance company and/or third party monitoring service.

Figure 2:
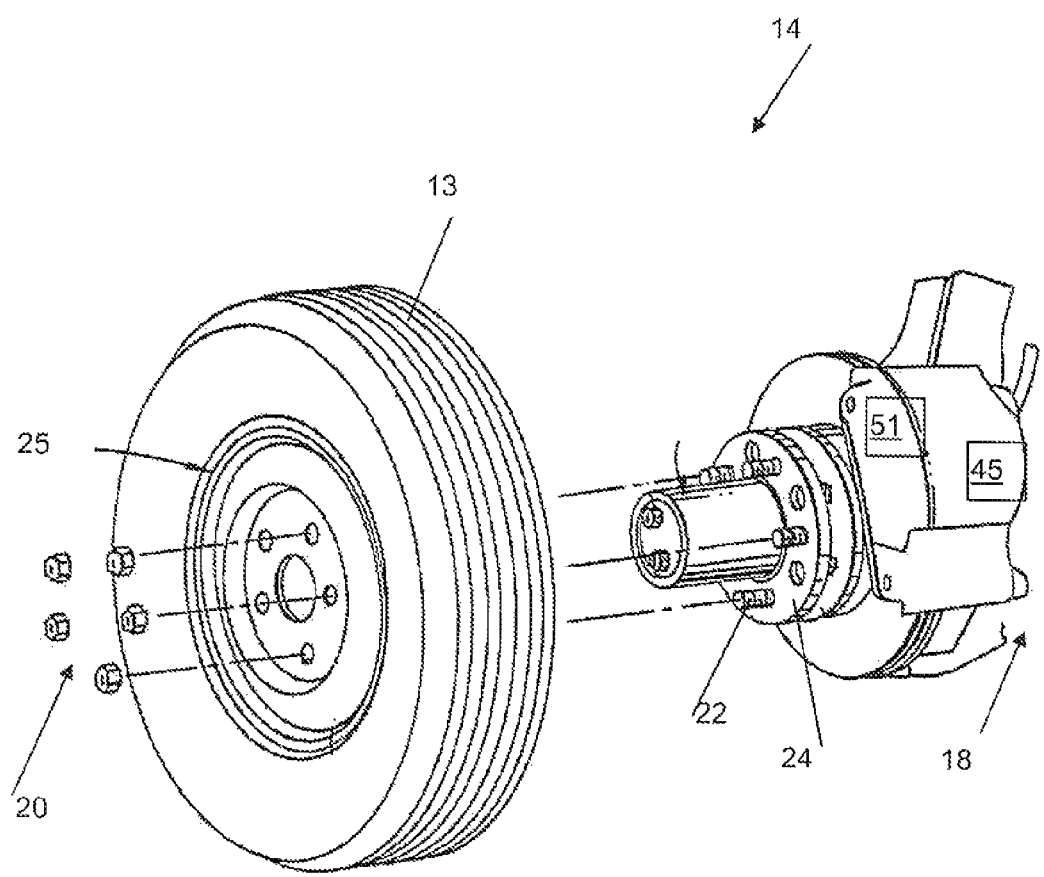
FIG. 2 is an exploded view of a wheel assembly of the system of FIG. 1.

Referring to FIG. 2, the wheel assembly 14 is mounted to an axle (not shown) via a wheel bearing 18 and generally includes at least one wheel 13 mounted on a wheel rim 25 and attached to a wheel hub 24 by a series of wheel studs 22 and wheel nuts 20. The number of wheel studs 22 is shown by example, however it is recognized that other wheel stud 22 numbers are possible (e.g. 10 in the case of transport truck wheel assemblies 14). It is recognized that in the case of a truck or other larger weight vehicle 16, the wheel assembly 14 can include more than one wheel 13 (see FIG. 1).

The detection data 12, as reported by sensors 29, 32, 33, 1404—see FIGS. 3a-3d, is representative of wheel attachment integrity and can include data such as but not limited to: temperature factors indicative of abnormal wheel bearing temperature (or rate or temperature rise) and/or factors indicative of a decrease in clamping pressure between wheel assembly 14 components, e.g. between the wheel 13 and the wheel hub 24 and/or between wheels 13 in the case of multi-wheel 13 wheel assemblies 14. It is recognized that changes (e.g. decrease) in clamping pressure between the detection device 8 and other component(s) of the wheel assembly 14 can be configured by the system 10 as indicative and/or representative of corresponding changes in relative clamping pressure between wheel assembly 14 component, one example as localized clamping force and another as overall clamping force. In one configuration of the system 10, the sensed clamping pressure is local clamping pressure associated uniquely with one of the wheel stud 22 locations. In another configuration of the system 10, the sensed clamping pressure is total surface pressure between the surface of the detection device 8 and an adjacent surface of at least one of the components of the wheel assembly 14). In terms of total or overall clamping pressure, this is defined as a representative clamping force or pressure between the two mating surfaces biased together by the aggregate contribution of all wheel bolt 22/wheel nut pairs used to assemble the wheel assembly 14. The two mating surfaces can be such as but not limited to: between the detection device 8 and the wheel rim 25; between the detection device 8 and the wheel hub 24; between the wheel rim 25 and the wheel rim 25 for multi-wheel 13 assemblies 14; and/or between the wheel rim 25 and the wheel hub 24.

In terms of localized clamping force, dirt, corrosion, and/or uneven or excessive paint layers or other debris existed at the time of assembling one or more of mating surfaces together in the wheel assembly (e.g. detection device 8 to wheel rim 25, wheel rim 25 to wheel rim 25, wheel rim 25 to wheel hub 24, detection device 8 to wheel hub 24, detection device 8 between wheel rims 25, and/or detection device 8 between wheel rim 25 and wheel hub 24) could be reflected in slight variations in the multiple respective clamping force pressures reported by the individual sensors 32 at different locations (identified as belonging to the respective individual sensors 32 by the unique indicators 34), which could be interpreted by a control unit 54 (see FIG. 7) that the respective mating surfaces are not properly mated together (e.g. are misaligned or otherwise improperly biased towards one another). Otherwise, variations between respective localized clamping pressures could be the result of location dependent variations in incompatible fastener components and parts; and worn or damaged studs or parts. It is recognized that the reported variations could be reported as differences for different locations on the same rim 25 (i.e. of the same wheel assembly 14) and/or for different locations on different rims 25 of different wheel assemblies 14 (e.g. a location on one wheel rim 25 and a location on a different wheel rim 25). It is recognised that the unique indicators 34 can be optional, for example in the case where the detection device 8 is mounted between wheel rims 25 and/or between the wheel hub 24 and a wheel rim 25 and thus obscuring view of the detection device 8 from the driver.

Figure 4A:
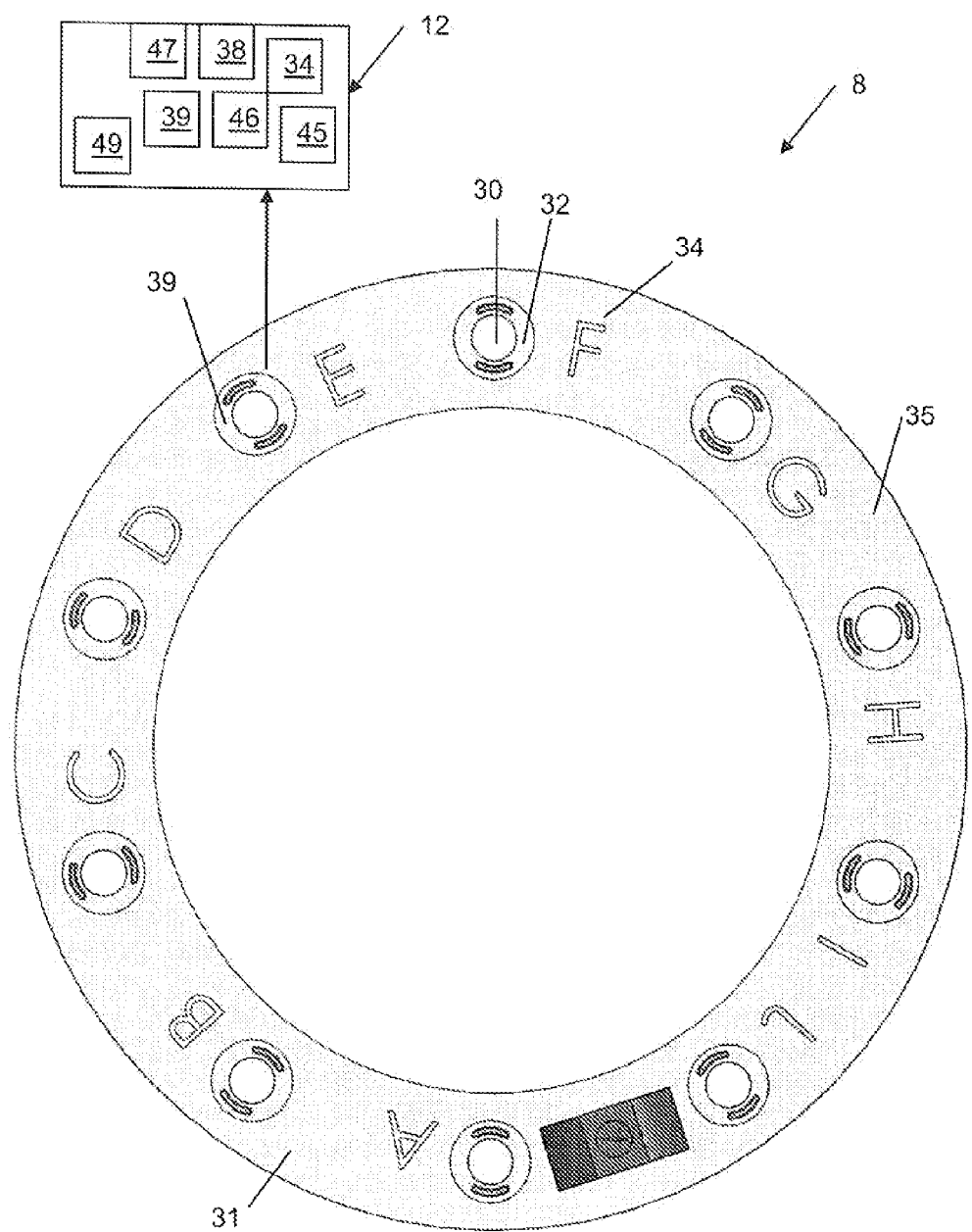
FIG. 4a is an embodiment of the detection device of the system of FIG. 1.

Alternatively, the detection data 12 can include a warning 49 (in the detection data 12—see FIG. 4a) to the driver (or corporate office or 3rd party) that after measuring a specified distance (e.g. 25 miles), either by the odometer or by an odometer sensor 51 (see FIG. 2) attached to a respective wheel assembly 14 (or axle) of the vehicle 16 (e.g. to an axle of a trailer hauled by a truck) from a wheel removal and reinstalled, that the vehicle 16 has reached the designated mileage (or time).

In terms of factors affecting the attachment integrity, an example of temperature issues is overheating or otherwise abnormal temperature rise characteristics of axle bearings 18 of the wheel assembly 14, as indicated in the detection data 12. It is recognized that the result of ignoring temperature issues could be separation of the complete wheel assembly 14 from the axle at the wheel bearing 18. Examples of stud issues is a lack of tightness of one or more of wheel nuts 20 on wheel studs 22 (see FIG. 2) and/or material or structural defects in one or more of the wheel studs 22 and/or wheel nuts 20 (e.g. worn threads, elasticity of threads, structural failure such as snapping of the wheel stud 22, etc.), any of which can impact clamping force or pressure (e.g. one or more local clamping force, total/overall clamping force, etc.) of one or more wheels 13 to a wheel hub 24 of the wheel assembly 14 as further described below. Another factor that can affect clamping force pressure is the improper mating of contact surfaces, for example due to the presence of foreign material (e.g. paint, corrosion, dirt, etc.) between contacting surfaces of wheel assembly 14 components (e.g. between the wheel rim 25 and the wheel hub 24).

In terms of reporting factors affecting the attachment integrity (e.g. temperature, pressure, etc.), the monitoring unit 9 can optionally report the detection data 12 locally (e.g. on-board the vehicle 16) to a user interface 26 (see FIG. 1) accessible by a driver of the vehicle 16, using local wired and/or wireless communication installed on the vehicle 16, as well as via a communications network 11 for communication (e.g. wireless communication) of the detection data 12 to a remote control center 28.

For example, the control center 28 could receive detection data 12 reporting from a number of monitoring units 9 associated with different vehicles 16 (e.g. a vehicle fleet) and could be operated by a company owing and operating the vehicle 16, by an independent third party control center providing active monitoring and reporting services to a number of different vehicle companies (e.g. trucking companies, vehicle rental companies, government regulatory agencies, etc.), etc. The control center 28 and/or the monitoring unit 9 could also transmit the data 12 to an insurance company 30 or other third party agency, as desired. For example, the data 12 could be sent via the network 11 to the trucking company's corporate office and a third party as a permanent record. This third party could be a third party supplied monitoring service, which in turn could communicate the data 12 with insurance companies and governments. Alternatively, wireless reporting of the detection data 12 can be done directly via the communications network 11 to the control center 28 and/or to the third party 30 via communication equipment associated with the detection device 8 itself, as compared to reporting of detection data 12 to the control center 28 and/or to the third party 30 indirectly via the monitoring unit 9. In other words, it is the monitoring unit 9 that could be in communication remotely with the control center 28 and/or to the third party 30 on behalf of the one or more detection devices 8 installed locally on the vehicle 16.

In one embodiment, the system 10 can use a cellular communications network as a first transmission method and if that network fails or is not available, the system 10 can be configured to automatically switch to a satellite communications network.

Figure 3A:
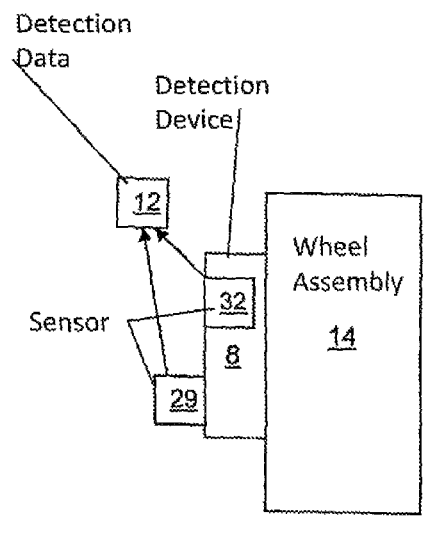
FIG. 3a is an embodiment of a sensor arrangement of a detection device of the system of FIG. 1.
Figure 3B:
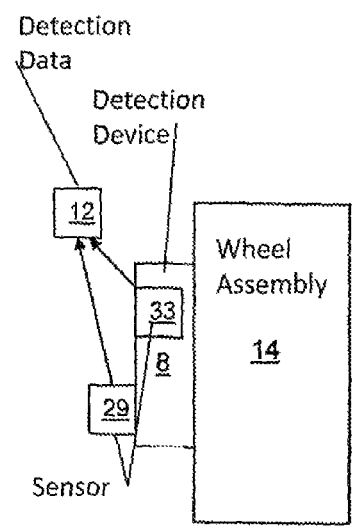
Figure 3C:
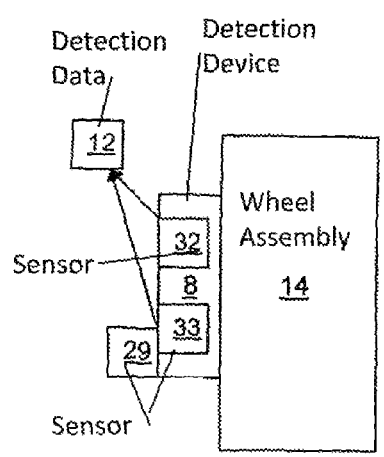
Figure 3D:
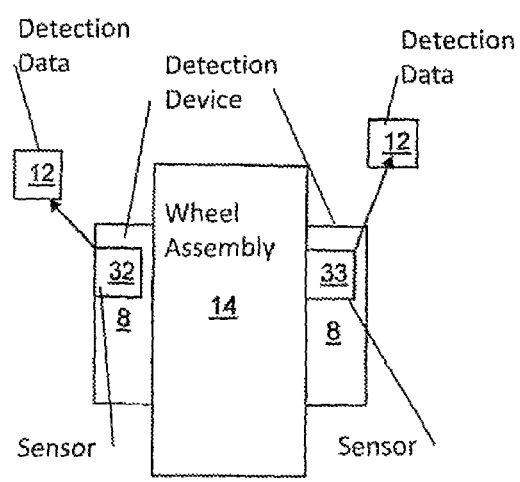

Referring to FIGS. 3*a,b,c,d* it is recognized that the detection device 8 can be embodied as a single unit coupled to the wheel assembly 14 having only one or more pressure sensors 32, 29 to transmit the detection data 12 (see FIG. 3*a*), only one or more temperature sensors 33 (and/or optionally sensors 29) to transmit the detection data 12 (see FIG. 3*b*), a single unit having one or more pressure sensors 32 and one or more temperature sensors 33 (and/or optionally sensors 29) to transmit the detection data 12 (see FIG. 3*c*), and/or a pair of units acting in concert to transmit the detection data 12 such that one of the units has one or more pressure sensors 32 and the other of the units has one or more temperature sensors 33 (and/or optionally sensors 29) (see FIG. 3*d*). In any event, it is recognized that the detection device 8 can be coupled any one or more components of the wheel assembly 14, in or more different locations (e.g. coupled to the wheel rim 25, coupled to the wheel hub 24, coupled between wheel rims 25 for multi-wheel 13 wheel assemblies 14, coupled between the wheel rim 25 and the wheel hub 24, or a combination thereof in the case of two or more units).

Examples of sensors 29, 32 (e.g. for clamping pressure/force which is a measure of the compressive force that a fastener exerts on a joint/mating surfaces which is a measure of the amount of force applied to tighten a threaded fastener determined by multiplying force times distance) can include: a pressure/force. In terms of pressure force sensors 32, these sensors can be configured with strain sensors to measure surface strains that occur when subject to specific forces depending on the rigidity of the structure under strain, and thereby calibrated to measure clamping force. Examples of specific clamping force sensors 29 can be piezoelectric and piezoresistive transducers, load cells and other sensors. With this method, a means to power the strain gauge bridge is used, as well as a means to receive the signal from the respective rotation between the wheel stud 22 and the wheel nut 20.

Preferably, the unit(s) of the detection device 8 are coupled to the component(s) of the wheel assembly 14 using apertures 30 in a rigid body 35 of the detection device(s) 8 (see FIG. 4*a,b*), such that the apertures 30 are configured to receive the wheel bolts 22 (see FIG. 2) there-through. The rigid body 35 can be manufactured out of a number of different materials, for example a stainless steel plate (or a disk) optionally configured as an annulus (e.g. donut-shaped), with the same hub and bolt-hole patterns to match that of the wheel (for example to the outside wheel 13 on all axle locations on both the truck and trailer as the vehicle 16). It is appreciated that the wheel studs 22 will mount through these bolt holes (e.g. apertures 30). One example feature of the encryption implemented by the monitoring unit 9 is to inhibit cross-talk between multiple vehicles 16 which may be in close proximity to each other during operation of their respective systems 10 when in motion. It is recognized that reporting of attachment integrity errors for wheel assemblies of one vehicle 16 to another vehicle's monitoring unit 9 can, preferably, be discouraged.

Figure 4B:
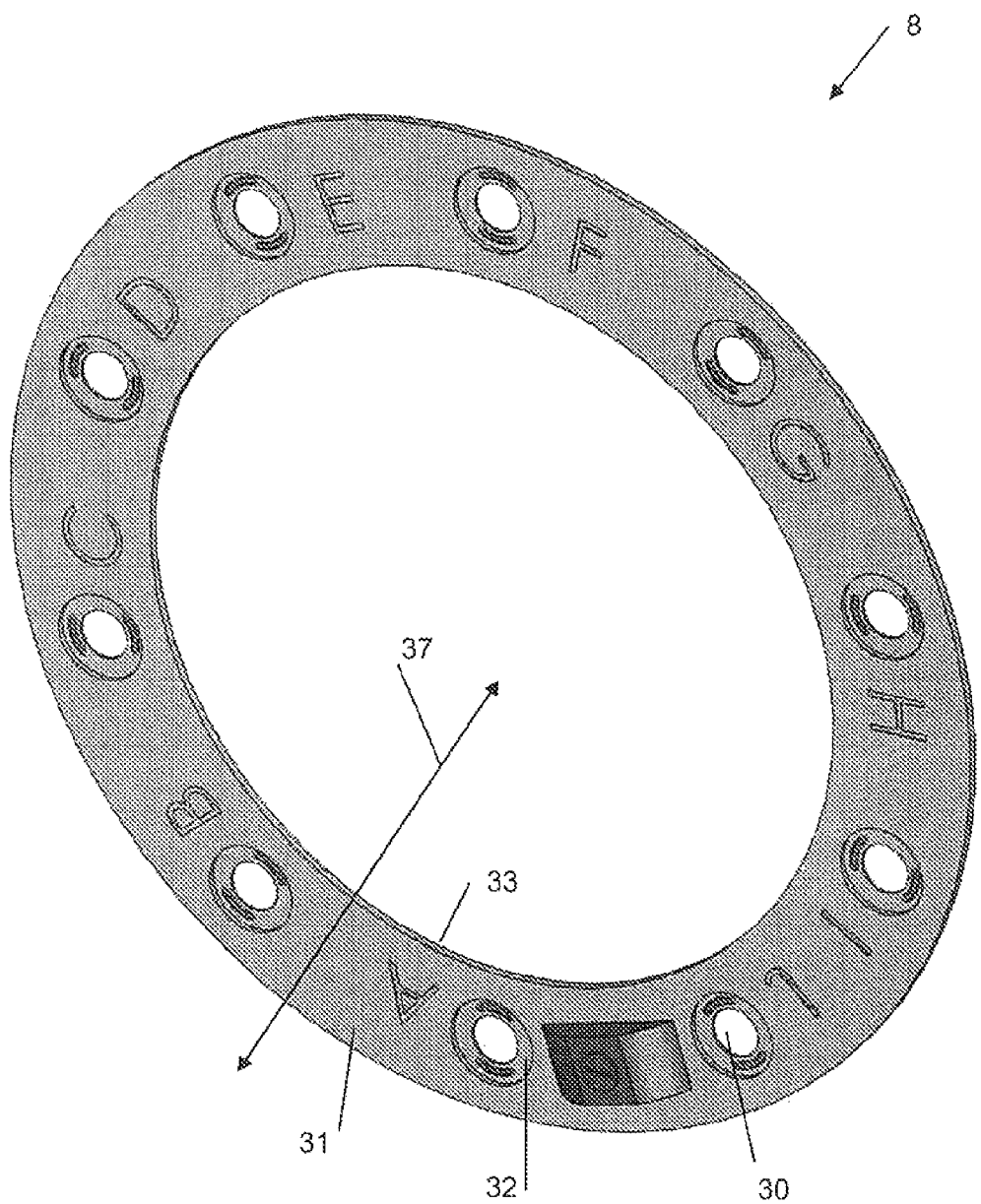

Referring again to FIG. 4*a*, an example detection device 8 is shown, including a plurality of circumferentially distributed apertures 30 configured for receiving the wheel bolts 22 (see FIG. 2) there-through, such that the apertures 30 extend axially between a first side 31 and a second side 33 (see FIG. 4*b*) and the first side 31 and the second side 33 define an axis 37 there between. The device 8 is adapted to include one or more pressure sensors 32 that, for example, can be associated with each of the apertures 30. It is recognized that the pressure sensor(s) 32 can be releasably secured to the rigid body 35 of the detection device 8 for ease of sensor maintenance/replacement. One advantage of the present detection device 8 configuration is that structural integrity of the wheel rim 25 and/or wheel hub 24 is not affected (e.g. by drilling holes therein or otherwise removing rim/hub material to accommodate presence of the sensors), as the sensors 32,34 are housed in the rigid body 35 rather than the wheel rim 25/hub 24.

Figure 6:
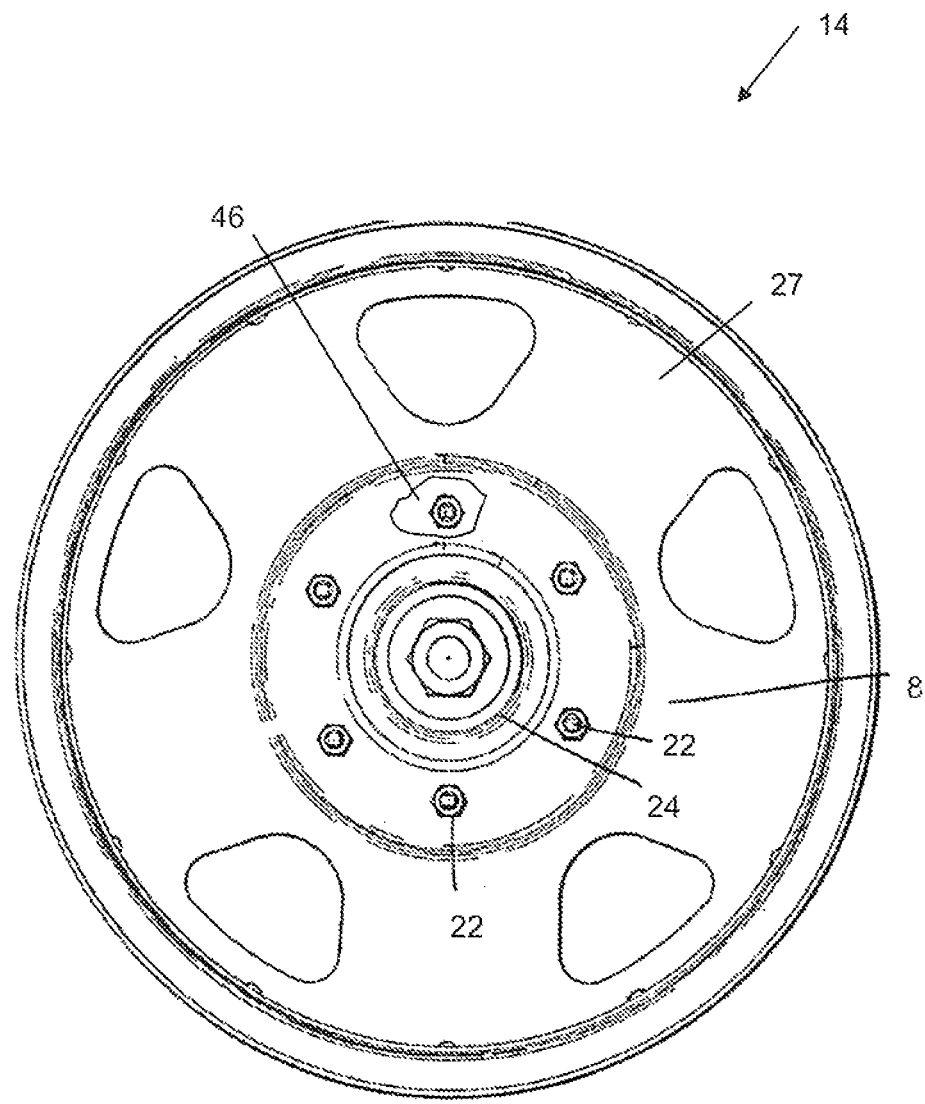
FIG. 6 shows a front view of a wheel of FIG. 1 with an installed detection device.

In one example, each of the apertures 30 has a pressure sensor 32 associated therewith, via a plurality of wheel nut mounting locations 39 positioned about each of the plurality of circumferentially distributed apertures 30 on the first side 31, each of the plurality of wheel nut mounting locations 39 having a mating surface for mating with an underside of a respective wheel nut 20. The rigid body 35 can also have one or more component (e.g. rim 25) mounting surfaces on the second side 33 for mating with an outwardly facing exterior surface 27 (see FIG. 6) of the rim 25. The device 8 can also include unique indicators 34, such that each of the apertures 30 has assigned one of the unique indicators 34. In other words, the plurality of indicators 34 are positioned adjacent to each of the plurality of circumferentially distributed apertures 30, such that each indicator 34 of the plurality of indicators 34 is uniquely associated with its respective aperture 30 of the plurality of circumferentially distributed apertures 30. One advantage for the use of the indicators 34 is ease of visual identification by an operator (or maintenance person) of the vehicle 14 for which wheel nut 20/wheel bolt 22 location is associated with the detection data 12 generated by the corresponding sensor 32 for a detection device 8 having a respective sensor 32 for each of the plurality of apertures 30.

The ease of identification of unique locations can be especially beneficial in configurations of the detection device 8 involving a plurality of sensor locations, thus providing for identification of attachment integrity issues for specific wheel bolt 22 and/or wheel nut 20 combinations that would otherwise not be visible to the naked eye. Examples of "invisible" attachment integrity issues could be fatigue in wheel nuts 20 and/or wheel bolts 22, and/or improper mating of surface contact between rims 25 (and/or between rim 25 and hub 24) due to the presence of foreign matter (e.g. dirt, paint, corrosion). Other attachment integrity issues that are location specific and also "invisible" are wheel temperature extremes (e.g. overheat) in wheel bearings 18 of specified wheel assemblies 14. In this manner, it is recognized that each of the wheel bearing sensors 33 could be coded by their wheel assembly location 45 (see FIG. 2) on the vehicle 16, thus providing for identification to the driver (or other recipient) of the detection data 12.

Figure 5:
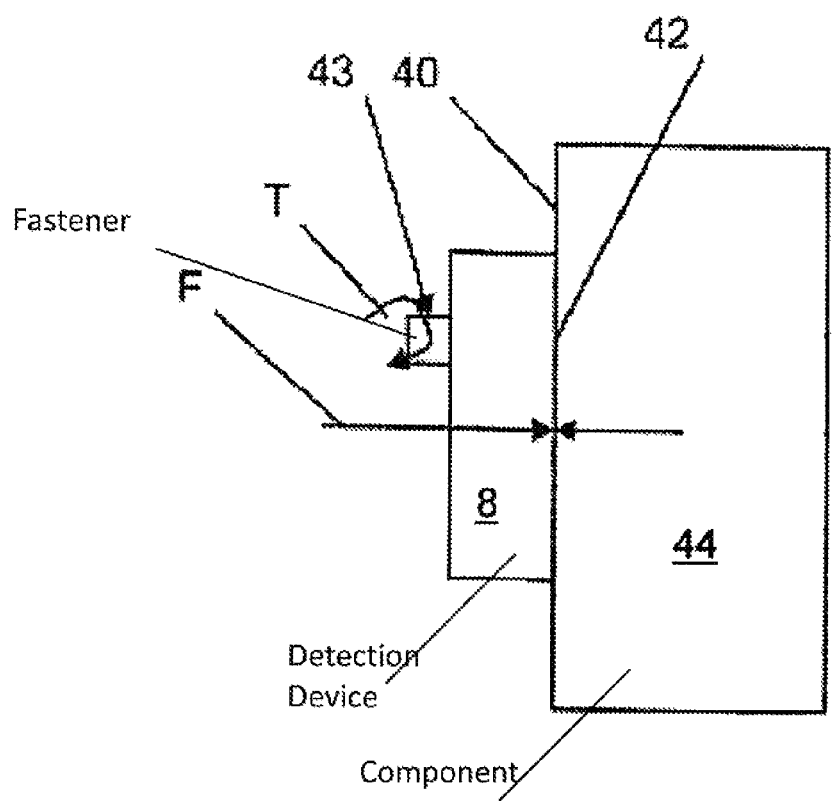
FIG. 5 shows an example of clamping force between components of a wheel assembly of the system of FIG. 1.

The role of the pressure sensor(s) 32 can be to provide pressure (also referred to as clamping force) data 38 for transmission in the detection data 12, such that the pressure data 38 is indicative of the degree of clamping force F (see FIG. 5) between a contact surface 42 of the detection device 8 and a contact surface 40 of a component 44 of the wheel assembly 14 (e.g. wheel rim 25, hub 24, etc.), as further described below. In the case of pressure sensing localized to a particular aperture 30, the pressure data 38 would also include the unique indicator 34 assigned to the respective aperture 30 and the individual pressure sensor 32 associated to the respective aperture 30, such that the pressure data 38 would be representative of a local clamping force F distributed between respective localized portions 46 (see FIG. 6) of the contact surfaces 40,42. Also considered is that the pressure sensor(s) 32 of the device 8 can be assigned a wheel assembly indicator 45, for inclusion in the detection data 12, thereby associating the pressure sensor(s) 32 with a particular wheel assembly 14 of the vehicle 16.

In terms of sensors 29 used for measurement, the role of the sensor(s) 29 can be to provide data 39 for transmission in the detection data 12 (see FIG. 4*a*), such that the data 39 is indicative of the degree/level of clamping force/pressure provided by a fastener component 43 of the wheel assembly 14 (e.g. wheel nut 20, wheel bolt 22 and/or wheel nut/bolt combination, etc.). In the case of sensing localized to a particular aperture 30, the data 39 would also include the unique indicator 34 assigned to the respective aperture 30 and the individual sensor 29 associated to the respective aperture 30, such that the data 39 would be representative of a local clamping force/pressure experienced by the fastener component 43 located at the aperture 30. Also considered is that the sensor(s) 29 of the device 8 can be assigned the wheel assembly indicator 45, for inclusion in the detection data 12, thereby associating the sensor(s) 29 with a particular wheel assembly 14 of the vehicle 16.

Therefore, each axle location, example right rear trailer axle, can be identified and therefore, the message of data 12 to the control unit 9 can specify axle/wheel and stud location and thus the clamping problem and level of severity associated with the data 12. Also considered is that the temperature sensor(s) 33 can be used to specify particular axle/wheel location 45 and thus the particular wheel assembly 14 having temperature issues.

An example embodiment of the indicators 34,45 is each truck and trailer unit, a numbering system designates the axle location. As example starting at the right front of the truck that position would be 'TRK-RA1" (Truck Right Axle #1) and the next axles would be TRK-RA2 and continue for all right axles on that truck. The trailers would start at the first axle on the right side from the front of the trailer, example "TRAL-RA1" (Trailer Right Axle #1) and continue down the right side of the trailer, whether it has two, three or whatever number of axles on the trailer. Next the left side, starting at the front truck axle would be "TRK-LA1" and continue down the truck and the first trailer would be "TRAL-LA1"

The temperature sensor(s) 33 can be used to specify particular axle/wheel location 45 and thus the particular wheel assembly 14 having temperature issues. In terms of temperature considerations, for example, should any bearing 18 on any axle, on the truck or trailer (e.g. vehicle 16), reach a specified threshold temperature, which from the manufacturer's specifications exceeds the safety level, a temperature message 47 (e.g. in the detection data 12—see FIG. 4*a*) can be transmitted to the monitoring unit 9 and also to the company's corporate office and the third party's location (e.g. 28,30). As above, the monitoring unit 9 (e.g. embodied as a Black Box recorder) can record the date, time and sensor readings of the data 12 (e.g. temperatures reached) and store this information as related to a particular wheel assembly and/or particular stud 22 location 34.

Figure 7:
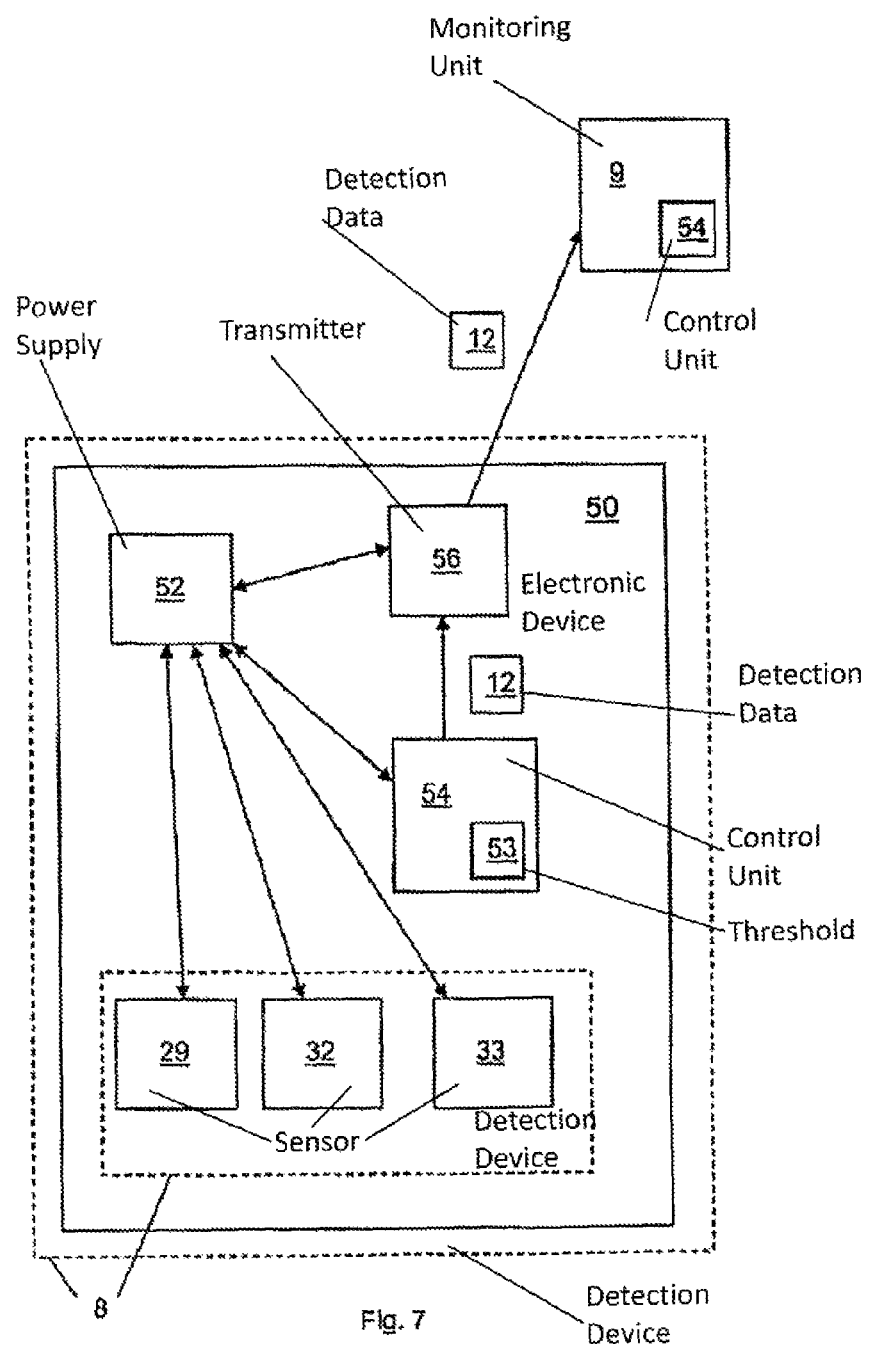
FIG. 7 is an example embodiment of an electronic unit associated with a detection device of the system of FIG. 1.
Figure 8:
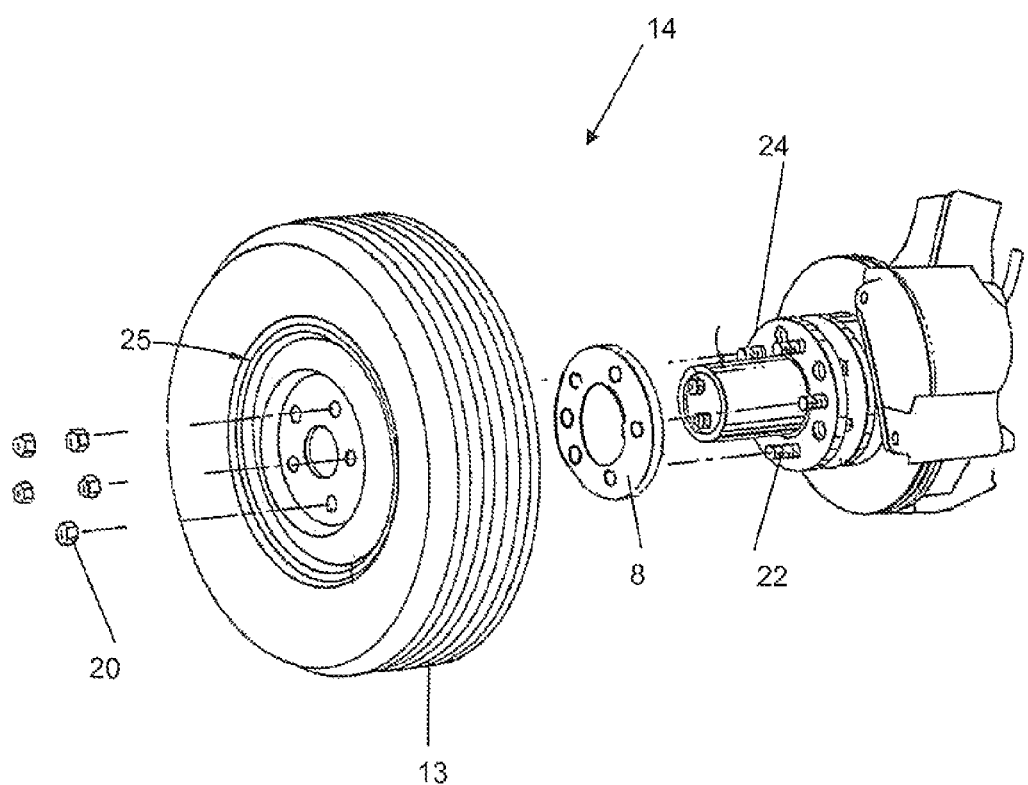
FIG. 8 is an embodiment of placement of the detection device in a wheel assembly of the system of FIG. 1.
Figure 9:
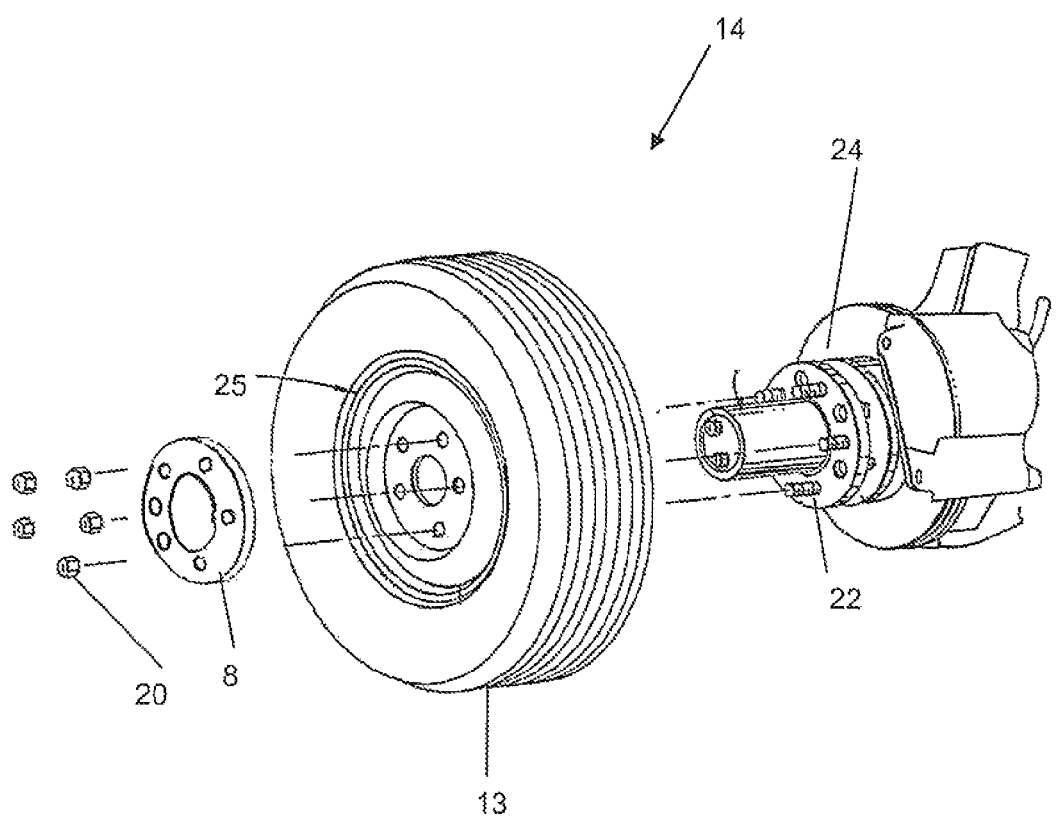
FIG. 9 is a further embodiment of placement of the detection device in a wheel assembly of the system of FIG. 1.
Figure 10:
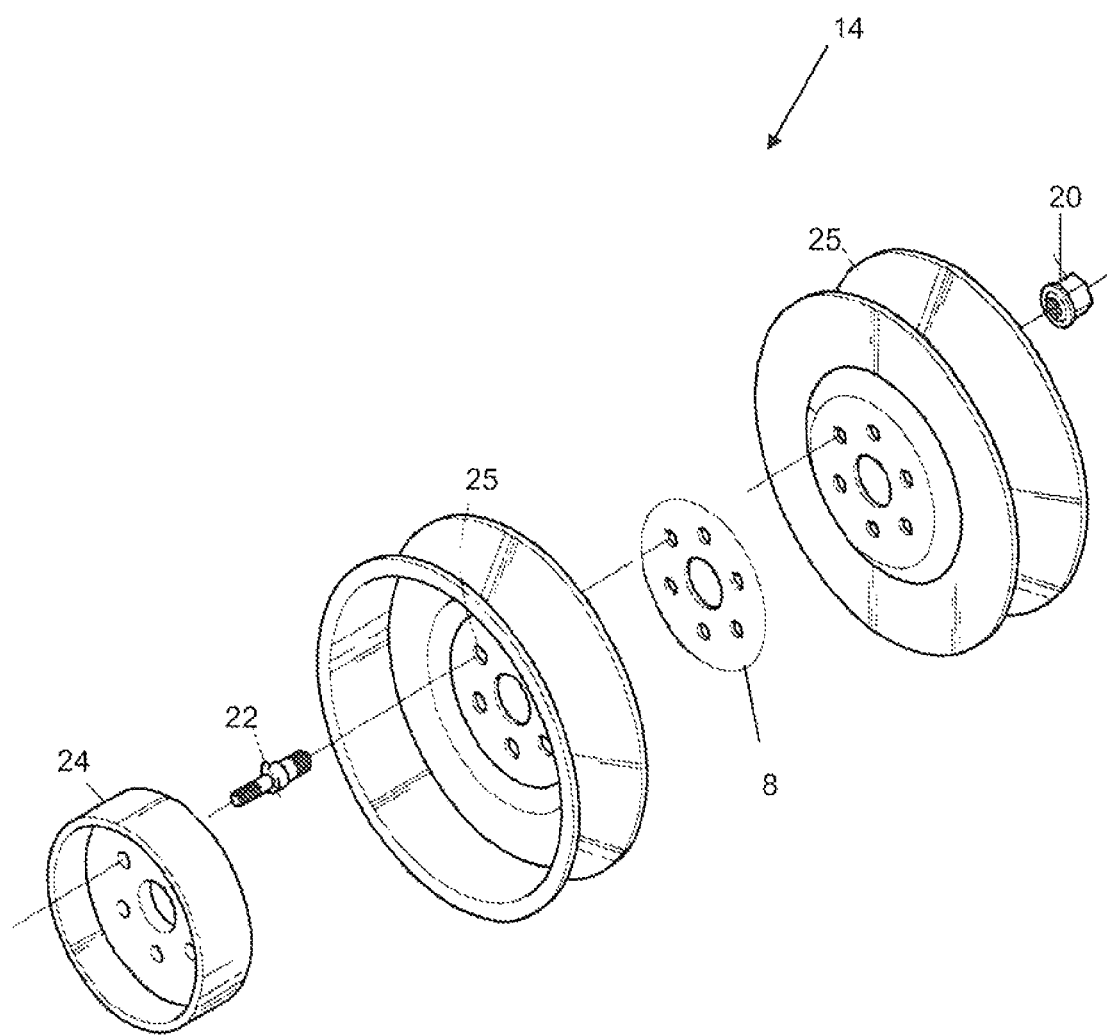
FIG. 10 is a further embodiment of placement of the detection device in a wheel assembly of the system of FIG. 1.
Figure 11:
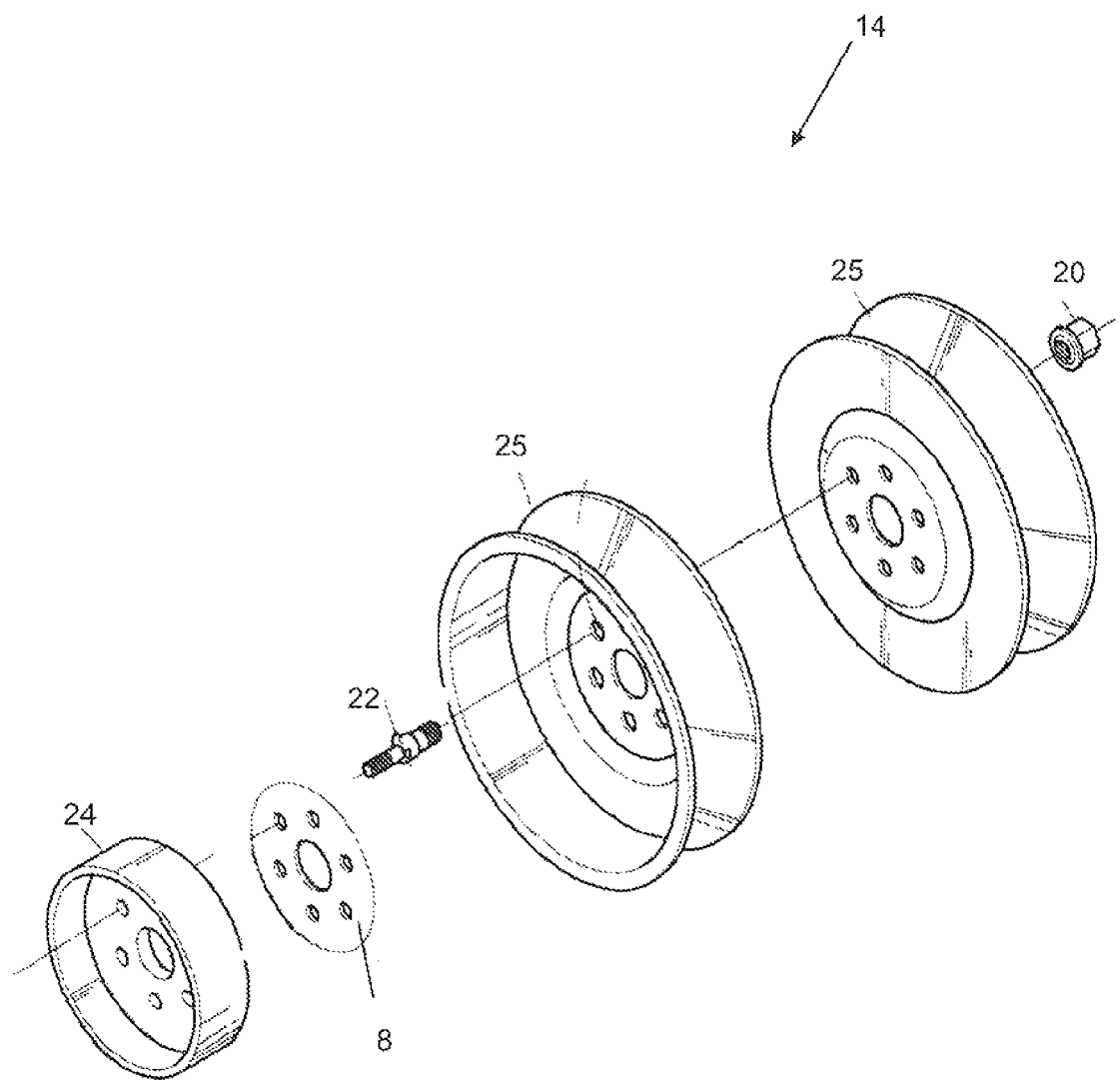
FIG. 11 is a further embodiment of placement of the detection device in a wheel assembly of the system of FIG. 1.

Referring to FIG. 7 as further described below, the sensors 29,32,33 of the detection devices 8 can be associated with an electronic device 50 including power supply 52 capabilities (e.g. battery) to the sensors 29,32,33,1404 where used to facilitate their sensing operation for pressure and/or temperature (in the case of electronically powered sensors), a control unit 54 (e.g. including a microprocessor and a physical memory) for determining when a trigger event has occurred based on pressure and/or temperature data from the sensors 29,32,33,1404 has exceeded a specified threshold 53 (e.g. local clamping force minimum, temperature maximum, rate of temperature rise maximum, overall clamping force minimum, etc.) or otherwise collecting the detection data 12 for transmission to the monitoring unit 9 for subsequent processing (e.g. determination of the trigger event), and/or a transmitter 56 (for example a wireless transmitter) for transmitting the detection data 12 to the monitoring unit 9 (see FIG. 1). It is recognized that each sensor 29,32,33, 1404 can have respective capabilities of such as but not limited to: the power supply 52, the control unit 54, and/or the transmitter 56. One example is where each of the sensors 29,32,33,1404 are considered stand-alone units 50 for sensing and transmission of the detection data 12. Alternatively, one or more of the sensors 29,32,33,1404 could be connected to a shared electronic device 50 that provides shared services on behalf of the connected sensors 29,32,33,1404 the shared services selected from just power, just data 12 collection, just data 12 transmission, just power and data 12 transmission, just power and data 12 collection, just data 12 collection and data 12 transmission, for example.

For example, the electronic device 50 (or monitoring unit 9) can be configured to detect an interruption in receipt of the detection data 12, which would be indicative of a loss of communication between the control unit 54 (of the device 50 or monitoring unit 9 remote from the detection device 8) and at least one of the one or more sensors 29,32,33,1404. Further, the loss of communication of all the detection data 12 between the control unit 54 and all of the one or more sensors 29,32,33,1404 could indicating an actual wheel loss event (e.g. separation of one or more wheels 13 from the vehicle 16). In one embodiment, loss of communication is detected by the control unit 54 recognizing that each data signal from each sensor 29,32,34,1404 is not present in the detection data 12, or recognizing that at least one data signal from at least one sensor 29,32,34,1404 is not present in the detection data 12. This could be detected by the control unit 54 checking for the presence of each indicator 34 in the detection data 12, thus confirming the presence and functional operation of each of the sensors 29,32,33,1404 in the system 10.

It is also recognized that the power supply 52 can be powered by a long life miniature battery, easily replaced and properly protected from the elements and functional in different weather conditions and extremes. When battery low in charge, the driver could receive a message (e.g. detection data 12) via the interface 26, which in turn could be recorded in a memory of the monitoring unit 9 and could also be sent to the control center 28. It is also recognized that the power supply 52 can be powered by through the use of kinetic batteries, thus providing an advantage of not having to replace batteries and they can be similarly be protected and functional in weather conditions. Further advantages are when a truck or trailer are not used for long periods, one does not need to be concern about the system functionality, as when the vehicle starts into motion, the kinetic battery is operational.

Examples of the trigger event as determined by the control unit 54, based on the received detection data 12 can include: provide data 12 including the clamping pressure (local and/or overall) for each wheel 13, for example by axle and stud 22 location on each outside wheel 13; when an action leads to a loss of clamping pressure the data 12 is automatically sent as a message to the driver via the interface 26; in one case, if temperatures continue to increase additional messages (e.g. detection data 12) can be sent for each incremental 5 degree increase (or other specified value increase and/or in real time or as specified by the manufacturer and/or government agencies); and/or shock load—which is a phenomenon of when a wheel 13 hits a pothole and the energy passes from the axle to the wheel 13 and can snap the studs 22 due to the energy travelling to the wheel 13. Also envisioned is sensing such that the trigger event as determined by the control unit 54, based on the received detection data 12, can provide data 12

(for each of the nuts 20) for each wheel 13, for example by axle and stud 22 location on each outside wheel 13.

In one embodiment, the PSI sensors (for sensing real-time inflation pressure of the tire mounted on the wheel) associated with each of the wheels 13 can use transmitters/receivers 56 tied into both the wheel and the instrument panel (e.g. interface 26). The PSI sensors can be positioned inside the tire or be embodied into the valve stem of the tire. The sending of a detection or warning message could be accomplished by transmission to the detection device 8 followed by transmission to the user interface 26. Alternatively, the warning message could be transmitted directly to the user interface 26 from the PSI sensor, which may be the preferred mechanism, as direct transmission from the PSI sensor to the user interface 26 is more direct and less complicated. Therefore, it is recognised that the transmitter/receiver capability of the PSI sensors could be used to receive the detection data 12 from the sensors 29,32,33 and retransmit the detection data 12 to the monitoring unit 9, either directly or indirectly via the interface 26.

Figure 12:
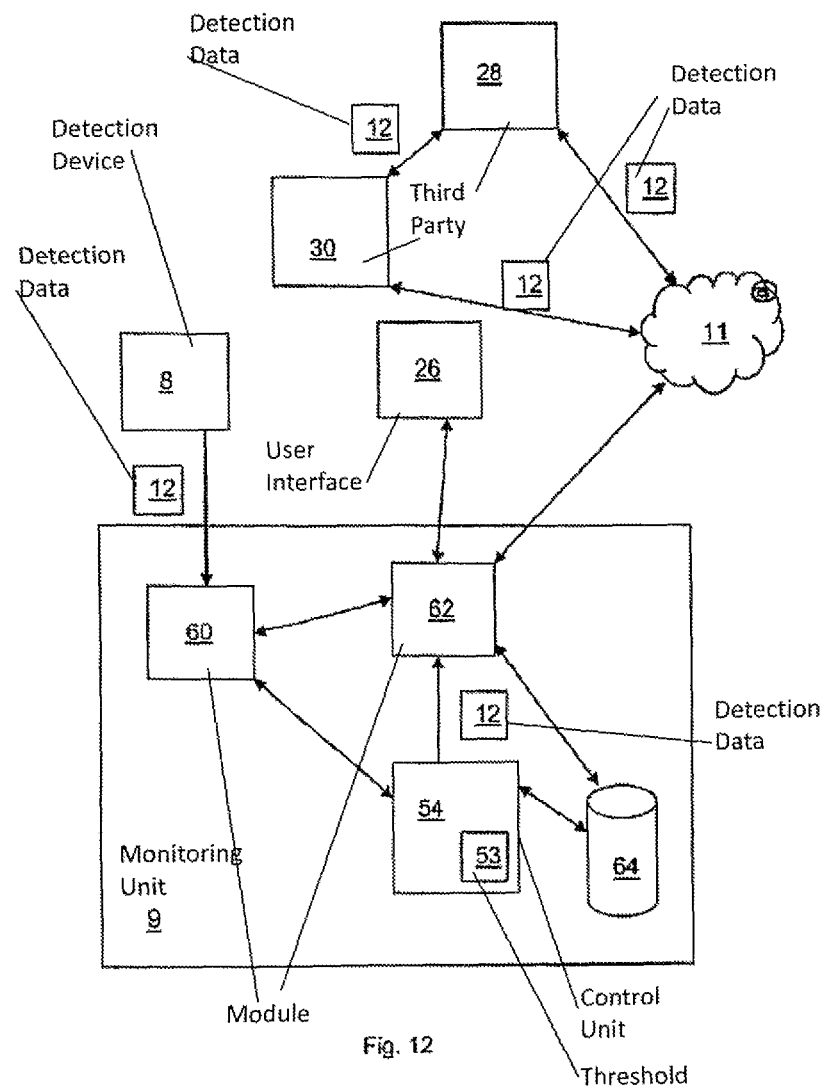
FIG. 12 is an example embodiment of a monitoring unit of the system of FIG. 1.
Figure 13:
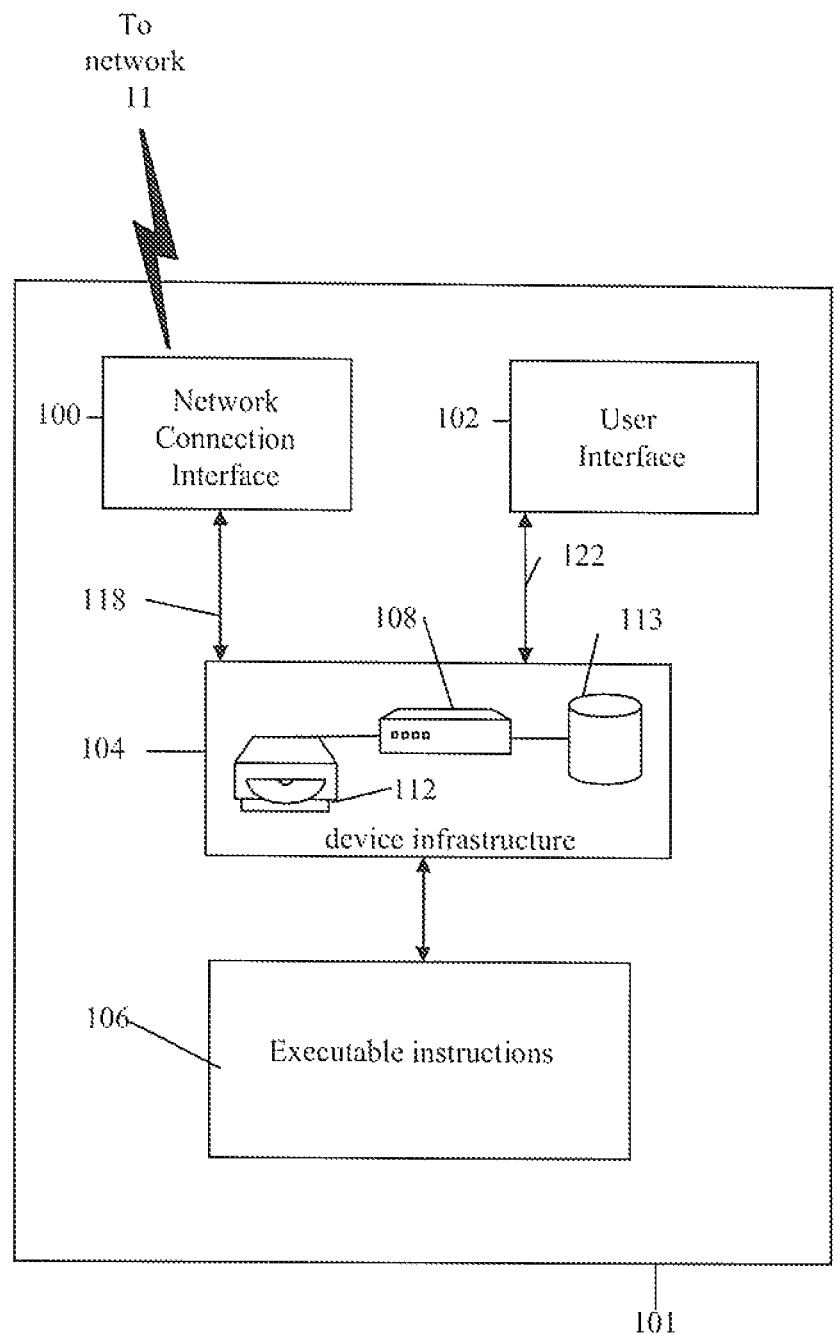
FIG. 13 is a block diagram of an example configuration of a computing device of the system of FIG. 1.

Referring to FIG. 12, shown is an example embodiment of the monitoring unit 9, including a communication module 60 for receiving the detection data 12 from sensed by the detection devices 8 (and/or intermediate electronic devices 50 when shared by two or more sensor arrangements), an optional control module 54 (e.g. including a microprocessor and a physical memory) for determining when a trigger event has occurred based on pressure, and/or temperature data 12 from the sensors 29,32,33,1404 has exceeded a specified threshold 53 (e.g. local clamping force minimum, temperature maximum, rate of temperature rise maximum, overall clamping force minimum, etc.), a transmission module 62 (e.g. wireless and/or wired communication) for collecting the detection data 12 (and if applicable determined trigger event) for transmission locally to the user interface 26 and optionally remotely over the communications network 11 to the control center 28 and/or third party 30, and a physical storage 64 for persistently storing the detection data 12 and optionally any determined trigger events 53, as desired.

The monitoring unit 9 is configured to receive the detection data 12 (e.g. pressure data, temperature data) from the sensors 29,32,33,1404. For example, the monitoring unit 9 would receive both the pressure data and temperature data, and based on comparison (e.g. by control unit 54) of the both the pressure data and temperature data against respective pressure and temperature thresholds 53, the monitoring unit 9 would be able to identify and report whether the identified attachment integrity issue(s) of the wheel assembly 14 is caused by wheel nut 20/wheel stud 22 issues and/or wheel bearing 18 issues. In this manner the attachment integrity issue(s) can be isolated for issue severity or priority, on a priority scale going from lower to higher. For example, indication of pressure issues for a minority number of wheel nut 20/wheel stud 22 locations would be treated as a lesser (lower) priority on the scale as compared to indication of pressure issues for a majority number of wheel nut 20/wheel stud 22 locations which would be treated as a greater priority on the scale. Further, the combination of indication of pressure issues for wheel nut 20/wheel stud 22 locations combined with temperature issues could be treated as higher priority on the scale, as well as indication of elevated temperature issues alone. In this manner, based on the sensing of both temperature related and pressure related issues, the level of priority of those issues could be communicated to the user interface 26 (e.g. displayed and/or audible alarm) by the monitoring unit 9, thus providing for a distinguishable issue priority alarm on the scale to the driver. For example, with one or two broken studs (or loose wheel nuts), the alarm issue signal for this could indicated to the driver as less severe (lower priority) on the scale than for a number of broken/loose studs/nut over a stud/nut maximum threshold which could indicated to the driver as more severe (higher priority) on the scale. In terms of detected temperature issues, the alarm issue signal for this could indicated to the driver as more severe (higher priority) on the scale depending upon the temperature level. It is recognised that a combination of detected pressure and temperature issues could be indicated to the driver as more severe (higher priority) on the scale.

Referring to FIGS. 1, 7, 13, 14 and 15, each of the above-described devices 8, 9, 26, 28, 50, 1406, 1407 can be implemented on one or more respective computing device(s) 101. The devices 101 in general can include a network connection interface 100, such as a wireless/wired network interface card or a modem, coupled via connection 118 to a device infrastructure 104. The connection interface 100 is connectable during operation of the devices 101 to the network 11 (e.g. an wired and/or wireless intranet and/or an extranet such as the Internet) coupled to the monitoring unit 9, the electronic device 50 and/or the user interface 26 of the vehicle 16, which enables the devices 101 to communicate with each other as appropriate. The interfaces 100 support the communication (wired/wireless) of the data 12 between the devices 8, 9, 26, 50.

Referring again to FIG. 13, the devices 101 can also have a user interface 102, coupled to the device infrastructure 104 by connection 122, to interact with a user (e.g. technician). The user interface 102 can be configured to operate with one or more user input devices such as but not limited to a QWERTY keyboard, a keypad, a track wheel, a stylus, a mouse, a microphone and the user output device such as an LCD screen display and/or a speaker. If the screen is touch sensitive, then the display can also be used as the user input device as controlled by the device infrastructure 1.

Referring again to FIG. 13, operation of the device 101 is facilitated by the device infrastructure 104. The device infrastructure 104 includes one or more computer processors 108 and can include an associated physical memory 113 (e.g. 64) (e.g. a random access memory) for storing of data parameters 12 (e.g. pressure/force and/or temperature factors). The computer processor 108 facilitates performance of the device 101 configured for the intended functionality (e.g. of the devices 8, 9, 26, 28, 50, 1406, 1407 and the associated sensors 29,32,33,1404 and functional components 52,54,56,60,64) through operation of the network interface 100, the optional user interface 102 and other application programs/hardware 106 of the device 101 by executing related instructions. These related instructions can be provided by an operating system, and/or software applications 106 located in the memory, and/or by operability that is configured into the electronic/digital circuitry of the processor(s) 108 designed to perform the specific task(s) of the devices 8, 9, 26, 50. Further, it is recognized that the device infrastructure 104 can include a computer readable storage medium 112 coupled to the processor 108 for providing instructions to the processor 108 and/or to load/update client applications 106. The computer readable medium 112 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory. It should be noted that the above listed example computer readable mediums 112 can be used either alone or in combination.

Further, it is recognized that the computing devices 101 can include the executable applications 106 comprising code or machine readable instructions for implementing predetermined functions/operations including those of an operating system, for example, in response to user command or input. The processor 108 as used herein is a configured device and/or set of machine-readable instructions for performing operations as described by example above. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality (e.g. any of devices 8, 9, 26, 50) provided by the systems and process of the FIGS may be implemented in hardware, software or a combination of both. Accordingly, the use of a processor 108 as a device and/or as a set of machine readable instructions is referred to generically as a processor/module for sake of simplicity.

It will be understood that the computing devices 101 may be, for example, programmable logic controllers or other network configured devices. Each server, although depicted as a single computer, may be implemented as a network of computer processors, as desired.

Further to the above, it is recognized that the detection device 8 can be installed as a replaceable component of the wheel rim 25 of the wheel assembly 14, such that the replaceable component is installable in contact with the rim 25 of another wheel 13 of the wheel assembly 14 and/or in contact with the wheel hub 24. Alternatively, it is recognized that the detection device 8 can be installed as an integral component (i.e. permanently formed and manufactured as integral to the rim 25 material) of the wheel rim 25 of the wheel assembly 14, such that the integral component is installable in contact with the rim 25 of another wheel 13 of the wheel assembly 14 and/or in contact with the wheel hub 24. Further to the above, it is recognized that the detection device 8 can be installed as a replaceable component of the wheel hub 24, such that the replaceable component is installable in contact with the rim 25 of the wheel assembly 14. Alternatively, it is recognized that the detection device 8 can be installed as an integral component (i.e. permanently formed and manufactured as integral to the hub 24 material) of the wheel hub 24, such that the replaceable component is installable in contact with the rim 25 of the wheel assembly 14.

In terms of material, the rigid body 35 of the detection device 8 can be a plate as shown or other shape (e.g. disk) and manufactured out of metal or other suitable material (e.g. composite material such as plastic, carbon fibre, fiberglass, etc.) for housing the sensors 32,34 and to provide a suitable mating surface and/or body for transferring clamping force (e.g. local and/or overall) between mating surfaces to the sensors 32 and/or temperature (or temperature rise) to the temperature sensor(s) 34. For example, body 35 materials that unpredictably deform (e.g. absorb part of) the clamping force when transmitted from the mating surfaces to the sensor(s) 32 could be unsuitable for use in constructing the detection device 8, as these materials could cause unreliability in detection of the clamping force(s) by the sensors 32 (e.g. under value or overvalue of the actual clamping force). In other words, preferably the body 35 material used is one that predictably deforms, or otherwise performs as a rigid body and thus the magnitude of any physical deformation of the material is negligible in view of the relative magnitude of the measured clamping force(s), thereby providing for reliability in detection of the clamping force(s) experienced between the mating surfaces by the sensors 32.

Further, body 35 materials that unpredictably absorb (e.g. absorb part of) the temperature or temperature rise when transmitted from the bearing to the sensor(s) 34 could be unsuitable for use in constructing the detection device 8, as these materials could cause unreliability in recording of the temperature readings by the sensors 34 (e.g. under value or overvalue of the actual temperatures/rate of temperature change). In other words, preferably the body 35 material used is one that predictably absorbs (e.g. absorb part of) the temperature or temperature rise when transmitted from the bearing to the sensor(s) 34, thus providing for reliability in recording of the temperature readings by the sensors 34.

It is also recognized that the detection data 12 can include information detected if a battery is failing or any part of the system 10 is not functioning adequately (e.g. sensors 32,34, electronic unit 50 or any of its components, monitoring unit 9, etc.), sent as a warning to the interface 26, truck dispatch office 28 and/or insurance company and third party monitoring service 30. Further, it is recognized that the system 10 can periodically test itself (e.g. every five minutes for the first hour), and that detection data 12 can include information detected from self-tests if a component is failing or any part of the system 10 is not functioning adequately (e.g. sensors 32,34, electronic unit 50 or any of its components, monitoring unit 9, etc.), sent as a warning to the interface 26, truck dispatch office 28 and/or insurance company and third party monitoring service 30.

Another embodiment of the unique indicators 34,46 is Color Code Indicators, such that the sensors 32,34 and/or device body 35 itself could have color coded indicators that are included in the data 12, to facilitate that the driver is looking at the correct wheel 13 and/or stud 22 location when alerted to a problem, as drivers can get confused as to which tire they are supposed to inspect. Another unique indicators 34,46 option is an LED light or other light positioned on the sensor 32,34 and/or on the rigid body 35 itself at each of the stud 22 locations which lights up to signify the problem. In this case the indicator 34,46 information may be optional and therefore not transmitted in the detection data 12.

Alternatives to the sensors 32 as described above are Shock Load detector—and/or vibration sensors.

It is further recognized that when a truck first hooks up to a trailer, the truck can send a message to each trailer sensor (e.g. sensors 29,32,33,1406) to make sure that all sensors are working. Detection data 12 as discussed above can also include activity data 1402.

As further described below, a detection system is implemented to provide on a real-time basis a warning message when someone is moving a vehicle, including a cab, trailer, or a cab and trailer combined, who is not authorized to move that vehicle. The system includes a messaging system to transmit the warning message to a remote monitoring service and/or to a third party such as the police alerting the remote monitoring service and/or third party that unauthorized use of the vehicle is in progress. The system can have a monitor and display within the driver area of the vehicle, and can function similar to a Black Box in an aircraft, where detection data representative of unauthorized use of the vehicle can be persistently recorded in terms of date and/or time unauthorized use was detected and other pertinent data. The data collected by the system can also represent adherence to a predefined schedule of operation of the vehicle by tracking factors such as the identity of operators who are in control of the movement of a shipment of cargo or the amount of time that each operator is in possession of the cargo. The system employs an authorization code set remotely by a control center or trucking company and provided to the operator of a vehicle to determine in real-time whether or not use of a vehicle is authorized use.

Figure 14:
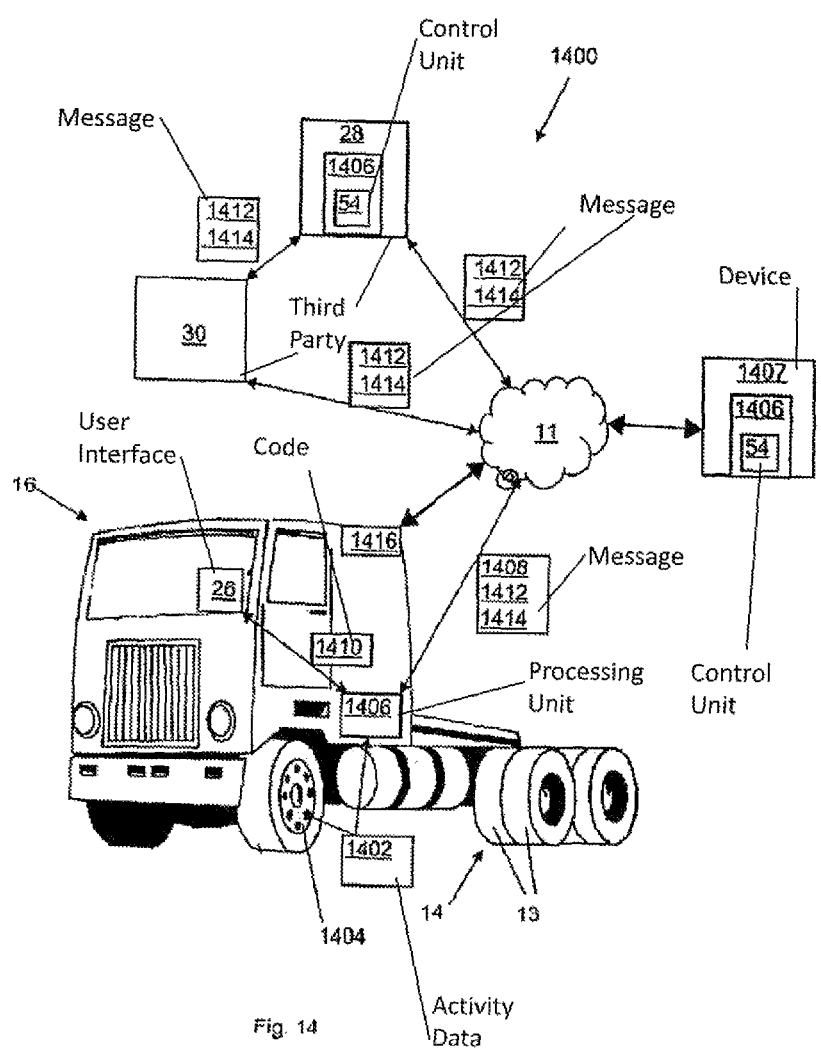
FIG. 14 is an alternative embodiment of FIG. 1 including theft detection.
Figure 15:
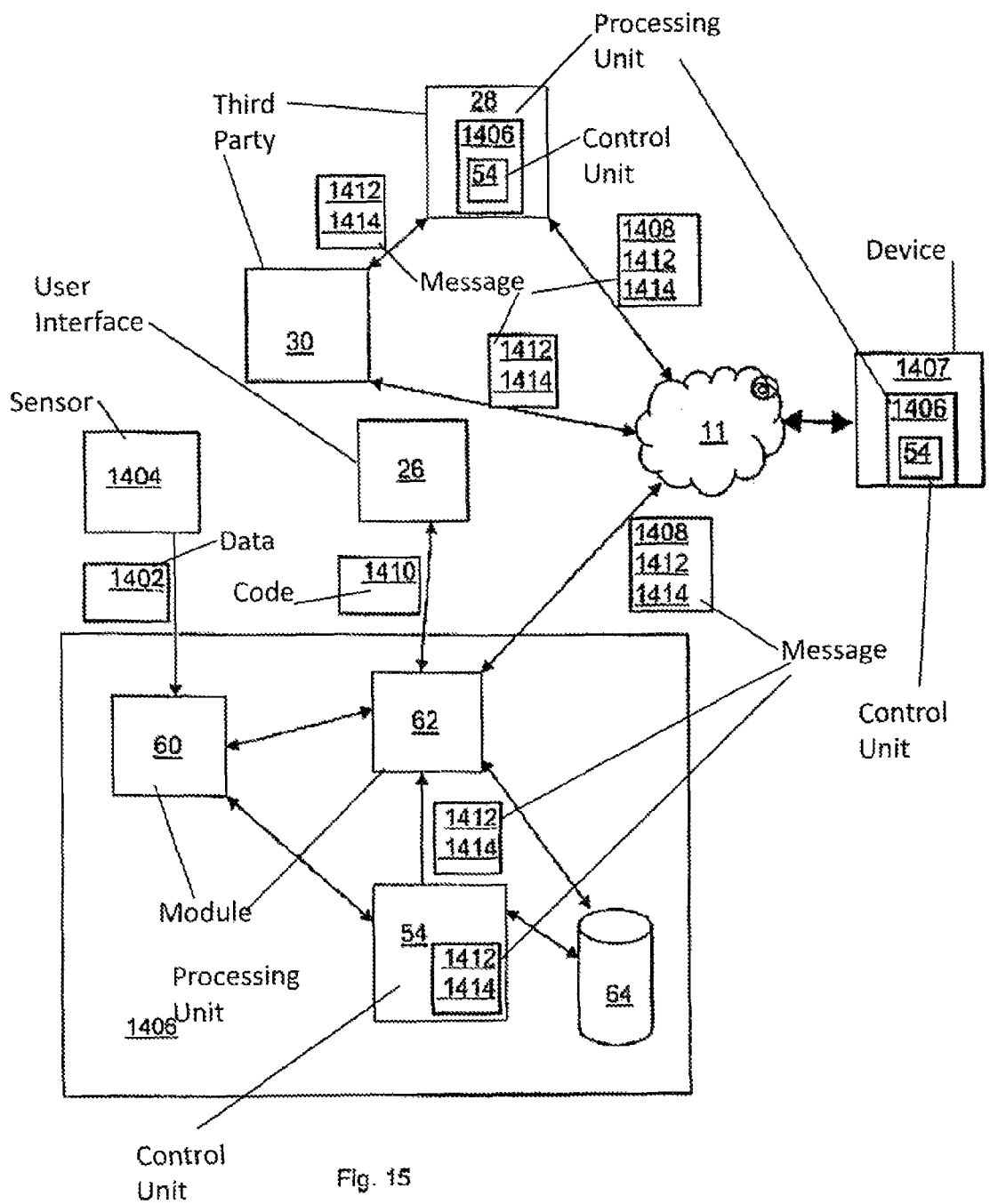
FIG. 15 is an example embodiment of a processing unit of the system of FIG. 14.

Referring to FIGS. 14-15, shown is a system 1400 for collecting activity data 1402 (e.g. detection data 12) representative of vehicle operation by a vehicle operator (e.g. a change in geographical location or the tethering of a trailer) from one or more sensing devices 1404 (e.g. a GPS unit or a trailer tether sensor) of a vehicle 16; for communicating the activity data 1402 (also referred to as detection data 12) to a receiver unit 60 of a processing unit 1406, the processing unit 1406 further comprising a receiver/transmission module 62 for receiving an authorization code 1408 from a remote control center 28 over a communications network 11 and an operator code 1410 entered into a user interface 26 by the vehicle operator, and a control module 54 for designating an authorization state 1414 as HOLD (i.e. unauthorized for use) in response to the receipt of the authorization code 1408 (e.g. from the remote server 1407, remote control center 28, etc.), for determining whether or not the authorization state 1414 and activity data 1402 (e.g. detection data 12) indicate that the vehicle is in use while the vehicle is designated as unauthorized to use, and for generating an unauthorized use message 1412 if the authorization state 1414 and activity data 1402 indicate that the vehicle is in use while the vehicle is designated as unauthorized to use; and for transmitting via a receiver/transmission module 62 the unauthorized use message 1412 over the communications network 11 to a remote control center 28 and/or a third party 30 such as an insurance company or police department, and optionally (e.g. where the vehicle 16 is a trailer) to a designated computing unit implementing the user interface 26 accessible by the operator of a cab. The system 1400 further provides for the processing unit 1406 to switch the authorization state 1414 from HOLD to RELEASE (i.e. authorized for use) or from RELEASE to HOLD if the control module 54 determines that the operator code 1410 matches the authorization code 1408, and to transmit notification of the current authorization state 1414 from the receiver/transmission module 62 over a communications network 11 to a remote control center 28 and/or a third party 30 and/or a designated computing unit implementing the user interface 26 accessible by the operator of the vehicle 16.

It is noted that the processing unit 1406 can embody functionality of the monitoring unit 9. As such it is understood that the monitoring unit 9 and processing unit 1406 can be defined as embodiments of one another, as desired.

The authorization code 1408 can comprise a code (e.g. numeric, alphanumeric, or alpha) supplied remotely for example by a remote control center 28 over a wireless communications network 11. The authorization code 1408 can be transmitted as cleartext or using cryptographic protection such as for example the Transport Layer Security protocol. The authorization code 1408 is received by a receiver/transmission module 62 within the processing unit 1406 and can be stored in the control module 54 as plaintext or in a cryptographically protected form. Alternatively the control module 54 may employ a cryptographic algorithm (e.g. a hash function) such that the original authorization code 1408 is stored remotely and a digest of the original authorization code is stored locally on the control module 54.

A code is a rule for converting a piece of information (e.g. a word or phrase) into another form or representation, not necessarily of the same type.

The control module 54 is configured such that reception and storage of the authorization code 1408 induces the control module 54 to establish the authorization state 1414 as HOLD. The current authorization state 1414 (i.e. HOLD or RELEASE) is stored in the control module 54 and is used by the control module 54, along with activity data 1402 input, to determine whether or not unauthorized use of the vehicle 16 is presently occurring. The setting of the authorization state as HOLD by the control module 54 upon receipt of an authorization code 1408 can optionally induce the processing unit 1406 to transmit a pre-determined message remotely over the communications network 11 to designated recipients that can include a remote control center 28, the message confirming that the authorization code 1408 was received by the processing unit 1406 and that the authorization state 1414 is currently set to HOLD pending the receipt of an accurate operator code 1410. This pre-determined message can be persistently stored in the processing unit 1406 and transmission of the message via the receiver/transmission module 62 can be induced by the receipt and/or storage of a new authorization code 1408.

The operator of a vehicle 16 can be provided with the operator code 1410 by for example a trucking company dispatch office. The operator code 1410 can be provided to the operator in person, over the phone, over a wireless network by email or text to a cell phone or handheld device, or as a message that is received by a computing device implementing a user interface 26 accessible by an operator of the vehicle 16. The operator code 1410 can comprise a numeric or alphanumeric code, and in one embodiment the operator code 1410 is identical to the authorization code 1408.

Prior to using a vehicle 16, the operator can be prompted by the user interface 26 to enter the operator code 1410, which can be received by the receiver/transmission module 62 of the processing unit 1406 over a wireless network 11 or via local wired communication installed on the vehicle 16. In an example embodiment where the vehicle 16 is a cab combined with a trailer and the processing unit 1406 is mounted on the trailer or is located in a remote server 1407, the operator can enter the operator code 1410 into the user interface 26 when the cab arrives at the trailer but before hooking up to the trailer. In such a case the operator code 1410 can be transmitted to the processing unit 1406 over a communications network 11. In an alternative embodiment where the vehicle 16 is a cab without a trailer, and the processing unit 1406 is mounted on the vehicle 16, an operator can enter the operator code 1410 into the user interface 26 upon entering the cab but before starting it. In this case the operator code 1410 can be transmitted to the processing unit 1406 via local wired communication installed on the cab or via a communications network 11.

An operator code entered into the user interface 26 can be received by the receiver/transmission module 62 of the processing unit 1406 and transmitted to the control module 54 to be processed. Processing comprises a comparison by the control module 54 of the operator code 1410 to the authorization code 1408 stored locally (e.g. as cleartext or cryptographically protected data), or if a hash algorithm is used, a comparison of the hashed version of the operator code 1410 to the stored hash. If upon comparison of the operator code 1410 and authorization code 1408 by the control module 54, the control module 54 determines that the operator code 1410 matches the authorization code 1408, then the control module 54 determines there is user authentication. Upon registering user authentication, the control module 54 switches the authorization state 1414 from HOLD to RELEASE. A switch of the authorization state 1414 to RELEASE can induce the processing unit 1406 to transmit a pre-determined message remotely over the communications network 11 to designated recipients who can include a remote control center 28, the message confirming that an operator code 1410 matching the authorization code 1408 was received by the processing unit 1406 and that the authorization state 1414 is currently set to RELEASE. The same message can optionally be sent via a communications network 11 or wired communication to a computing device implementing the user interface 26 to verify to the operator that the vehicle 16 is authorized for use. This pre-determined message can be persistently stored in the processing unit 1406 and can be sent via the receiver/transmission module 62 when a change in the authorization state 1414 from HOLD to RELEASE is detected by the processing unit 1406.

It is recognized that the operator code 1410 can be entered by an operator of the vehicle 16 into a user interface 26 mounted in the vehicle 16 (e.g. mounted in the cab or mounted on the trailer). Alternatively, the operator code can be entered from a wireless device such as a personal digital assistant independent of the vehicle. In such a case, the wireless device can possess a GPS unit and be configured to transmit geographical position information simultaneously with the operator code to the processing unit 1406. The processing unit 1406 can be configured to compare the geographical position information received from the wireless device to geographical position information transmitted from a GPS unit 1416 mounted to the vehicle 16 and received by the processing unit 1406, and if the processing unit 1406 determines from this comparison that the location of the wireless device is more than a threshold distance (e.g. 10 meters) from the vehicle 16, the processing unit 1406 can be configured to remain in its current authorization state 1414 even if the control module 54 determines that the received operator code 1410 matches the authorization code 1408. In response to a determination that the wireless device and the vehicle 16 are greater than a threshold distance apart, the processing unit 1406 can be configured to send a pre-determined message to the wireless device, and optionally a remote control center 28 indicating that the authorization state 1414 was not changed from its previous state despite that a correct operator code was received, because the distance between the wireless device where the operator code was entered and the vehicle 16 is too great.

It is recognized that in processing the operator code 1410 the control module 54 can determine that the operator code 1410 entered at the user interface 26 does not match the authorization code 1408. The control module 54 can be configured to count the number of consecutive comparisons resulting in a mismatch that the control module 54 executes of the operator code 1410 against the authorization code 1408 and to send a pre-determined message to designated recipients in the event that this number reaches a set threshold (e.g. 3). The pre-determined message can be persistently stored in the processing unit 1406 and can warn designated recipients such as a remote control center 28 or a third party 30 such as an insurance company or police that a possible theft is in progress and that further investigation may be warranted.

Once the authorization state 1414 has been switched to RELEASE as a result of user authentication, the control module 54 can switch the authorization state 1414 to HOLD if the control module 54 receives the operator code 1410 from the user interface 26. This is contemplated if for example the operator stops the vehicle 16 for a break prior to reaching his destination. Once the operator stops the vehicle 16, the operator can enter the operator code 1410 into the user interface 26 from where it can be transmitted to the receiver/transmission module 62 and then to the control module 54. If the control module 54 determines that the operator code 1410 matches the authorization code 1408, then user authentication is achieved and the control module 54 can switch the authorization state 1414 from RELEASE to HOLD. As before, the processing unit 1406 can be configured to respond to a switch in the authorization state 1414 by sending a pre-determined message to designated recipients, including a remote control center 28 over a wireless network 11 and/or the operator of the vehicle 16 at the user interface 26, advising that the authorization state 1414 is currently set to HOLD. This pre-determined message can be persistently stored in the processing unit 1406 and can be sent via the receiver/transmission module 62 when a change in the authorization state 1414 from RELEASE to HOLD is detected by the processing unit 1406. Subsequent entry of the operator code 1410 into the user interface 26 (e.g. after a break is finished) would through the above-described processing result in the authorization state 1414 switching back from HOLD to RELEASE, and notification of this switch in the authorization state 1414 can again be transmitted to designated remote and/or local recipients. It is recognized that the authorization state 1414 can be switched between HOLD and RELEASE multiple times during a trip by the operator entering the operator code 1410 at the user interface 26.

It is recognized that changing of the authorization code 1408 can be necessary. This could be because a cab or trailer is to be transferred to a different operator at a stop-point prior to cargo arriving at its final destination or because cargo has arrived at its destination and the cab or trailer is to be used for a new job. The timing of the change of the authorization code can depend on the location of the vehicle 16 as determined by a GPS unit 1416 mounted on the vehicle 16. The remote control center 28 can monitor the position of the vehicle 16 via geographical positioning data sent to it through a wireless network 11 by the GPS unit 1416. When the GPS data indicates that the vehicle 16 has reached its destination or a location where operators are scheduled to be changed, the remote control center 28 (or for example the remote server 1407) can change the authorization code. In the alternative, the timing of the changing of the authorization code can depend on the amount of time elapsed or the mileage accumulated by the vehicle 16 since the current operator code 1410 was first received by the control module 54 to set the authorization state 1414 to RELEASE. Mileage information can be transmitted from the odometer to a computing device implementing the user interface 26 via a local wireless network or local wired communication installed on the cab, and the computing device can broadcast the data over a wireless network 11 to a remote control center 28. In the further alternative, the user interface 26 can provide for the input of data at the end of an operator's trip that indicates that the trip is completed. This data can take the form of a short message entered into the user interface and stored in the implementing computing device, or alternatively the data could be generated by the operator simply pressing a button or key predetermined as representing that the operator's trip is completed. The inputted data could then be transmitted by the computing device to a remote control center 28 over a wireless network 11 to alert the remote control center 28 that the authorization code 1408 should be changed.

The authorization code 1408 can be changed by the remote control center 28 transmitting to the processing unit 1406 a new authorization code 1408, or in the case of a cryptographic algorithm, a digest of the new authorization code. The authorization code 1408 can be received by the receiver/transmission module 62 of the processing unit 1406 and transmitted to the control module 54, which can be configured to replace the previous authorization code 1408 or algorithm with the new authorization code 1408 or algorithm. The control module 54 can be configured to respond to replacement of the previous authorization code 1408 or algorithm with the new authorization code 1408 or algorithm by checking as to whether the authorization state 1414 is set to HOLD, and if it is not, switching the authorization state 1414 to HOLD. It is recognized that ordinarily at the time of the change of the authorization code 1408 the authorization state 1414 would be set to HOLD, given that the operator has completed his trip, but this may not always be the case, for example if the operator neglected to enter the operator code 1410 at the end of the trip. Once the authorization code 1408 or algorithm is changed, the next operator must input a new operator code into the user interface 26 in order to switch the authorization state to RELEASE. The authorization code 1408 can be provided to the new operator by a number of means including but not limited to in-person, over the phone, over a wireless network by email or text to a cell phone or handheld device, or as a message that is received by a computing device implementing a user interface 26 accessible by an operator of the vehicle 16.

The processing unit 1406 can be configured to store each authorization state 1414 change event and to make these records available to authorized users such as a remote control center 28 and/or a third party such as an insurance company 30. Remote access to the records can occur over a wireless communications network 11 that uses a secure connection such as a virtual private network (VPN). Each authorized user can be provided with a login and password to remotely access and download the information stored in the processing unit 1406.

When the authorization state 1414 is set to HOLD, the vehicle 16 is considered to be unauthorized for use. Activity representative of vehicle 16 operation by a vehicle 16 operator can be detected by one or more sensing devices 1404 mounted to the vehicle 16. An example of a sensing device 1404 is a GPS unit 1416, which can be configured to transmit geographical coordinates as activity data 1402 to the processing unit 1406, either over a communications network 11 (e.g. to a remote server 1407) or a wired connection installed on the vehicle 16. Where the vehicle 16 is a cab without a trailer, a sensing device 1404 can include but is not limited to a device that detects engine motion or exhaust output. Where the vehicle is a trailer alone or a cab in combination with a trailer, examples of a sensing device 1404 can include but are not limited to a trailer tether sensor or a motion sensor. For example, regardless of the type of sensing device 1404 employed, the sensing device 1404 can be configured to send a signal (i.e. activity data 1402) to a communication module 60 of the processing unit 1406 upon detection of activity of the vehicle 16. Where a processing unit 1406 is located on a remote server 1407, the one or more sensing devices 1404 can be configured to transmit activity data 1402 over a wireless communications network 11 to be received by a receiver/transmission module 62 of the processing unit 1406.

It is recognized that a motion sensor can be embodied as a sensor on the detection device 8 (see FIG. 1). In such an embodiment the activity data can be incorporated into detection data 12 and transmitted to a monitoring unit 9, which could house in whole or in part the processing unit 1406.

Activity data 1402 can be transmitted from the sensing device 1404 to the control module 54 of the processing unit 1406, which can process the activity data 1402 to determine whether or not the activity data 1402 is representative of use of the vehicle. The processing unit 1406 can determine whether or not activity data 1402 is representative of use of the vehicle 16 by comparing activity data 1402 received from the sensing device 1404 at one time point to activity data 1402 received from the sensing device 1404 at a consecutive time point. For example, where the sensing device 1404 is a GPS unit 1416, the activity data 1402 can be representative of geographical coordinates detected and transmitted by the GPS unit 1416. The processing unit 1406 can process the activity data 1402 by comparing the geographical coordinates embedded in the activity data 1402 currently received by the processing unit 1406 to the geographical coordinates embedded in the activity data 1402 last received by the processing unit 1406. If after the comparison the processing unit determines that the geographical coordinates have changed then this would be indicative of use of the vehicle. A sensing device 1404 can be configured to transmit activity data in desired intervals, for example every 30 seconds.

Where the processing unit 1406 compares activity data 1402 from two consecutive time points and determines that the activity data 1402 has not changed from one time point to the next, then the vehicle 16 is not in use and the processing unit can be configured to not undertake further analyses. Where the processing unit 1406 determines from a comparison of activity data from two consecutive time points that the activity data 1402 has changed from one time point to the next, then the vehicle 16 is in use. At this point the processing unit 1406 can be configured to determine whether or not the authorization state 1414 is set to HOLD. If the processing unit 1406 determines that the authorization state 1414 is set to HOLD, then unauthorized use of the vehicle 16 has been determined. On the other hand, if the processing unit 1406 determines that the authorization state 1414 is set to RELEASE, then the use of the vehicle is authorized.

In another embodiment the system 1400 can be configured such that activity data 1402 is only processed by the control module 54 when the authorization state 1414 is set to HOLD. For example, the processing unit 1406 can be configured to send a signal to the sensing device 1404 when the authorization state 1414 is set to RELEASE, the signal directing the sensing device 1404 to either not detect activity of the vehicle 16 or to not transmit activity data 1402 collected in response to activity of the vehicle 16. The processing unit 1406 can be configured to transmit a second signal to the sensing device 1404 when the authorization state 1414 switches to HOLD, the second signal directing the sensing device 1414 to detect activity of the vehicle 16 and to transmit activity data 1402. As a result of this signaling from the processing unit 1406 to the sensing device 1404, activity data 1402 would only be received by the processing unit 1406 when the authorization state 1414 is set to HOLD. If the processing unit 1406 then determines by processing the activity data 1402 that the vehicle is in use, then this determination would automatically trigger an unauthorized use message 1412. In an alternative embodiment, the functionality of the sensing device 1404 can remain constant and the processing unit 1406 can be configured to process transmitted activity data 1402 only in the event that the authorization state 1414 is set to HOLD.

If the control module 54 determines that the activity data 1402 and authorization state 1414 are representative of unauthorized use, the processing unit 1406 can be configured to respond to the determination by sending an unauthorized use message 1412 in real-time over a communications network 11 to for example a remote control center 28, a remote monitoring service, or a third party 30 such as an insurance company or local or state/provincial police. This unauthorized use message 1412 can include a message with a pre-determined portion stored in the processing unit 1406 advising of the fact of unauthorized use as well as a unique portion that incorporates information retrieved from a GPS unit 1416. The information in the unique portion of the message can comprise the current location of the vehicle, determined by the GPS unit 1416 mounted to the vehicle. GPS information can be sent to the processing unit 1406 using a wireless communications network 11 (e.g. where the processing unit 1406 is located on a remote server 1407) or wired communication installed on the vehicle 16. The processing unit can be configured to collect the GPS data and to add it as the unique portion of the unauthorized use message 1412.

As described above, the configuration of the system 1400 ensures that an unauthorized use message 1412 can only be sent when the authorization state 1414 is set to HOLD, and never when the authorization state is set to RELEASE. The message could be a text, email, telephone call with a predetermined voice message, or any other form of message that can alert a remote recipient of unauthorized use. It is recognized that one or more designated recipients of the unauthorized use message 1412 may be able to be reached at all times. In the event that the vehicle 16 is a trailer, the processing unit 1406 can optionally transmit the unauthorized use message 1412 remotely over the network 11 to a computing device implementing a user interface 26 accessible by an operator of a cab that has been designated as a recipient of the unauthorized use message 1412. Configuring the processing unit 1406 to transmit unauthorized use messages 1412 to the user interface 26 of a designated cab has the advantage of providing a real-time alert to an authorized operator (i.e. an operator who has received an active authorization code) who has failed to input the authorization code into the user interface 26 before moving a trailer. In such a case, the operator could immediately enter the operator code into the user interface 26 to switch the authorization state 1414 to RELEASE and contact the control center 28 and/or third parties (e.g. by using a cell phone or through a computer implementing the user interface 26) to advise that the authorized operator is in control of the vehicle 16 and that the previous unauthorized use message 1412 can be ignored.

It is recognized that the processing unit 1406 can be configured to send additional unauthorized use messages 1412 to the above designated recipients at pre-determined time points following the determination of unauthorized use. Each additional unauthorized use message 1412 can comprise a message that re-iterates in a pre-determined message portion that unauthorized use is in progress and in a unique message portion provides an updated location of the vehicle unit 16 based on geographical positional information provided by the GPS unit 1416. If a police department is a designated recipient of the unauthorized use message 1412, the police can respond immediately to the message by proceeding to the location of the vehicle provided by the GPS information contained in the most recent message received. Alternatively, a remote control center 28 upon receiving the unauthorized use message 1412 can contact the police requesting an immediate response, informing them of the approximate current position of the vehicle based on the information provided in the most recent unauthorized use message 1412. The processing unit 1406 can be configured to store all sent unauthorized use messages 1412 and to make them available to authorized users such as a remote control center 28 or a third party 30 such as an insurance company or local or state/provincial police through a communications network 11. Remote access to the records can occur over a wireless communications network 11 that uses a secure connection such as a virtual private network (VPN). Each authorized user can be provided with a login and password to remotely access and download the information stored in the processing unit 1406.

In one embodiment, the system 1400 can employ a processing unit 1406 located on a remote server 1407. Further, the remote control center 28 or a remote monitoring service can be administered by the remote server 1407. The one or more sensing devices 1404 can be configured to transmit activity data 1402 to the remote server 1407 over a wireless communications network 11. Likewise, the operator code 1410 can be transmitted to the remote server 1407 over a wireless communications network 11 from a user interface 26 mounted to the vehicle 16, including a cab or trailer, or from a wireless device such as a personal digital assistant. To inhibit an operator from causing the authorization state 1414 to switch while the operator is remote from the vehicle (e.g. if the vehicle 16 is a trailer and the operator enters the operator code while remote from the vehicle 16), the wireless device or the computer implementing the user interface 26 can possess a GPS unit and be configured to transmit geographical position information to the processing unit 1406 at the same time that the operator code entered by the operator is transmitted to the processing unit 1406. The processing unit 1406 can compare the geographical position information received from the wireless device or user interface 26 to geographical position information transmitted from the GPS unit 1416 mounted to the vehicle 16 and received by the processing unit 1406, and if the processing unit 1406 determines from this comparison that the location of the wireless device or user interface 26 is more than a threshold distance (e.g. 10 meters) from the vehicle 16, the processing unit 1406 can be configured to remain in its current authorization state 1414 even if the control module 54 determines that the received operator code 1410 matches the authorization code 1408. In response to the processing unit 1406 determining that the wireless device or user interface 26 and the vehicle 16 are greater than a threshold distance apart, the processing unit 1406 can be configured to transmit a pre-determined message to the wireless device or user interface 26, and optionally to a remote control center 28, indicating that the authorization state 1414 was not changed from its previous state despite that the correct operator code was received, because the distance between the wireless device or user interface 26 where the operator code was entered and the vehicle 16 is too great.

In one embodiment, the system 1400 can use a cellular communications network as a first transmission method and if that network fails or is not available, the system 1400 can be configured to automatically switch to a satellite communications network.

Referring to FIG. 15, shown is an example embodiment of the processing unit 1406, including a communication module 60 for receiving the activity data 1402 provided by the sensor 1404; a receiver/transmission module 62 (e.g. wireless and/or wired communication) for receiving the authorization code 1408 provided through the network 11 by a remote control agency 28 and the operator code 1410 entered at the user interface 26 and for reporting the authorization state 1414 and unauthorized use messages 1412 remotely over the communications network 11 to the control center 28 and/or third party 30 and optionally locally to the user interface 26; a control module 54 (e.g. including a microprocessor and a physical memory) for determining and storing the current authorization state 1414 as HOLD or RELEASE, for processing activity data, for comparing the activity data to the current authorization state 1414, and for generating unauthorized use messages 1412 if a comparison of the activity data 1402 to the current authorization state 1414 indicates that the vehicle is being used while the authorization state 1414 is set to HOLD; and a physical storage 64 for persistently storing unauthorized use events, authorization states 1414, and optionally activity data 1402.

In one embodiment, the processing unit 1406 can have a persistent memory configured as a Black Box, such that access to the persistent memory can be protected using AES encryption (or other encryption) to inhibit tampering by taking apart the Black Box and attempts to reverse engineer the processing unit 1406 or have unauthorized alteration and/or access to the activity data 1402, unauthorized use data 1412 or authorization states 1414 recorded and stored therein.

Below is provided an example embodiment of the system. A driver of a truck who is in the process of picking up cargo or will be driving to another location to pick up cargo can be given a security code in the form of a specific "Trip Number" from the trucking company's dispatch office. The Trip Number can be sent to the driver's cellular phone or to his onboard computer via Satellite. Alternatively, if the driver is in Canada and is to pick up a load of cargo in for example the United States, he can be given an envelope containing the Trip Number and all other paperwork, including the plate number of the trailer to be retrieved, before leaving the yard in Canada. The driver is expected to record the Trip Number into his log book, which can be a manual or computer record. The Trip Number is the important information (i.e. authorization code) that the system 1400 uses to secure a load of cargo and to monitor its movement.

A trucking company can determine its own unique coding system for deriving a Trip Number. The Trip Number can be numeric or alphanumeric, although the increased complexity provided by an alphanumeric code would make it preferred. For example, the Trip Number could consist of the first three letters in the company name, the first four alphanumeric numbers of the trailer and an additional four digit numeric number, sequentially assigned at the company's office. Alternatively, the Trip Number can be simply a numerically sequenced numbering system assigned by the trucking company's office. The Trip Number can also be used as a tracking number for the transport of the cargo shipment or vehicle.

When first picking up a load, which is typically a trailer full of cargo, the driver enters the Trip Number as the operator code 1410 into the truck's user interface 26, which can be a cab monitor or computer system. The cab monitor can be specifically designed to implement the system 1400, including communication with the processing unit 1406, and can be supplied to the driver by a remote control center, or the system implementation requirements, including communication with the processing unit 1406, can be integrated into a pre-existing computer system in the cab.

The Trip Number would have been previously sent directly to the trailer monitoring device or processing unit 1406 from the trucking company's dispatch office. Receipt of the Trip Number by the processing unit 1406 would set the authorization state 1414 of the trailer to HOLD. Only when the driver enters the same Trip Number into the cab monitor (i.e., user interface 26) as the operator code 1410 will a match occur with the previously received data and the authorization state 1414 switched to RELEASE. Once a match has been verified, a message is sent back to the trucking company's dispatch office to confirm that the load has been picked up, which in turn will provide the tracking mechanism to the company.

When the cab/trailer unit, or just the trailer, is parked for a pre-determined period of time, which could be one hour or more, the driver will enter into the cab monitor (i.e., user interface 26) the Trip Number which then switches the authorization state 1414 to HOLD. This could simply be because the driver is stopping for coffee or for a break, but in any such situation(s) where the vehicle is out of control of the driver, it is critical that the vehicle is monitored by setting the authorization state 1414 to HOLD. Once the authorization state 1414 has switched from RELEASE to HOLD, a message will be sent to the trucking company's dispatch office informing it of the switch.

When the driver who stopped for a short time returns to pick up the vehicle, he will enter the Trip Number into the cab monitor, which will again serve to switch the authorization state 1414 of the vehicle from HOLD to RELEASE.

In many cases trailers are dropped off at a yard and picked up hours later by another cab and driver. Therefore the system 1400 conceives of a means for a trucking company office to determine if the authorization state of the trailer is set to HOLD while the trailer is not being used and to ensure that the authorization state 1414 is not switched to RELEASE unless the processing unit 1406 receives the operator code 1410, which will originate from the next cab and driver picking up the trailer. This will entail the new driver being given a new and different Trip Number, which has been previously transmitted to the processing unit 1406 of the trailer in advance of pick-up.

If a cab hooks up to the trailer without entering the Trip Number, messages can be automatically and simultaneously sent to the original driver's cell phone and cab monitor and the trucking company's office number and optionally to pre-determined email addresses. Additionally, the system can transmit the same message to a pre-determined phone number of a third party, which could be the local or state/provincial police, or their insurance company. Regardless of who is selected to receive such messages, at least some recipients could be continuously available to receive a message, in order for the system to maximize its effectiveness in intercepting the theft of the vehicle.

The cab and trailer monitors will be programmed to record any unauthorized use messages for future use and to keep them in data storage for a defined period of time (e.g. up to three months) following which the messages can be uploaded to the trucking company's corporate office.

The system 1400 includes a GPS feature such that the system can be programmed, in the event of the unauthorized movement of a unit (i.e. a theft), to send periodic messages to the above-mentioned and pre-determined phone numbers or email addresses. The messages can be sent every 1-2 minutes as requested during the original installation and established by the company and possibly on a recommendation by the police.

It is recognized that if a trucking company uses trailers that do not possess sensing devices 1404 capable of transmitting activity data 1402 to a processing unit 1406, no part of the system 1400 will work with that trailer, despite that a user interface 26 may be installed in the cab. When a cab first hooks up to a trailer, a test message can be sent from the cab monitor (i.e. user interface 26) to verify that a processing unit 1406 is present and functional. If no response is received from the processing unit 1406, the computer module associated with the user interface 26 can log that the system 1400 is not operational.

We claim:

1. A warning device for detecting attachment integrity issues of a wheel assembly of a vehicle while the vehicle is in motion, the device comprising:
   a rigid body having:
      a first side and a second side to define an axis there between;
      a plurality of circumferentially distributed apertures extending axially between the first side and the second side, such that a spatial distribution of the plurality of circumferentially distributed apertures corresponds to a spatial distribution of wheel hub studs configured to receive a rim of the wheel;
      a plurality of wheel nut mounting locations positioned about each of the plurality of circumferentially distributed apertures on the first side, each of the plurality of wheel nut mounting locations having a mating surface for mating with an underside of a respective wheel nut;

one or more rim mounting surfaces on the second side for mating with an outwardly facing exterior surface of the rim; and one or more sensors mounted adjacent to the rigid body, the one or more sensors configured to generate a data signal associated with any of the plurality of circumferentially distributed apertures, such that the data signal provides data measuring a level of local clamping pressure between the respective wheel nut and the mating surface of said any of the plurality of circumferentially distributed apertures.

2. The device of claim 1, wherein the rigid body has a plurality of indicators positioned adjacent to each of the plurality of circumferentially distributed apertures, such that each indicator of the plurality of indicators is uniquely associated with a respective aperture of the plurality of circumferentially distributed apertures.

3. The device of claim 2, wherein the one or more sensors is further configured to measure clamping pressure applied to the respective wheel hub stud on which the respective wheel nut is mounted as uniquely identified by the respective indicator.

4. The device of claim 1, wherein said one or more sensors is further configured to measure overall clamping pressure representative of an aggregate clamping pressure between the one or more rim mounting surfaces on the second side and the outwardly facing exterior surface of the rim.

5. The device of claim 1, wherein the data signal is indicative of tightening of respective wheel nut over or under a specified tightening threshold.

6. The device of claim 5, wherein the specified tightening threshold is a clamp force threshold.

7. The device of claim 6, wherein the specified tightening threshold is a clamp pressure threshold.

8. The device of claim 1, wherein the one or more sensors are each mounted between the respective mating surface and the underside of the respective wheel nut.

9. The device of claim 8, wherein the sides of the rigid body are planar.

10. The device of claim 1 further comprising a control unit for processing the detection data against a specified threshold indicative of an integrity issue to generate an alarm signal in the event that the detection data exceeds the specified threshold.

11. A warning system for detecting attachment integrity issues of a wheel assembly of a vehicle while the vehicle is in motion, the system comprising:

a rigid body having:
  a first side and a second side to define an axis there between;
  a plurality of circumferentially distributed apertures extending axially between the first side and the second side, such that a spatial distribution of the plurality of circumferentially distributed apertures corresponds to a spatial distribution of wheel hub studs configured to receive a rim of the wheel;

one or more sensors mounted adjacent to the rigid body, the one or more sensors including at least one pressure sensor and at least one temperature sensor, the pressure sensor configured to generate a pressure data signal associated with any of the plurality of circumferentially distributed apertures and the temperature sensor configured to generate a temperature data signal associated with a wheel bearing of the wheel assembly, such that the pressure data signal provides data measuring a level of local clamping pressure between the respective wheel nut and the mating surface of said any of the plurality of circumferentially distributed apertures and the temperature data signal is indicative of temperature of the wheel bearing; and a control system mounted on the vehicle and having a receiving unit comprising a receiver for receiving both the pressure data signal and the temperature data signal and providing indication of the data signals to a driver of the vehicle.

12. The system of claim 11, wherein the control system is further configured to transmit indication of the data signals wirelessly to a monitoring service remote from the vehicle.

13. The system of claim 11, wherein the rigid body is incorporated as integral to the rim of the wheel assembly.

14. The system of claim 11, wherein the rigid body is incorporated as integral to the wheel hub of the wheel assembly.

15. The system of claim 11, wherein the rigid body is configured for being received into a recess of the wheel hub of the wheel assembly and releasably attached to the wheel hub of the wheel assembly.

16. A warning device for detecting attachment integrity issues of a wheel assembly of a vehicle while the vehicle is in motion, the device comprising:

a rigid body having:
  a first side and a second side to define an axis there between;
  a plurality of circumferentially distributed apertures extending axially between the first side and the second side, such that a spatial distribution of the plurality of circumferentially distributed apertures corresponds to a spatial distribution of wheel hub studs configured to receive a rim of the wheel;
  a plurality of first mounting surfaces positioned about each of the plurality of circumferentially distributed apertures on the first side, each of the plurality of mounting surfaces having a mating surface for mating with an adjacent mating surface of a wheel rim of the wheel assembly; and
  one or more second mounting surfaces on the second side for mating with an adjacent mating surface of a wheel hub of the wheel assembly; and one or more sensors mounted on the rigid body, the one or more sensors configured to generate a data signal associated with any of the plurality of circumferentially distributed apertures, such that the data signal provides data measuring a level of local clamping pressure of any of the plurality of circumferentially distributed apertures as experienced by the rigid body positioned between the wheel rim and the wheel hub.

17. The warning device of claim 16, wherein the one or more sensors are mounted between the wheel rim and the mating surface of the first side.

18. The warning device of claim 16, wherein the one or more sensors are mounted between the wheel hub and the mating surface of the second side.

* * * * *